United States Patent
Honda et al.

(10) Patent No.: US 11,424,703 B2
(45) Date of Patent: Aug. 23, 2022

(54) MOTOR CONTROL DEVICE, MOTOR CONTROL METHOD, AND OPTICAL APPARATUS

(71) Applicant: CANON KABUSHIKI KAISHA, Tokyo (JP)

(72) Inventors: Hirofumi Honda, Machida (JP); Tomohiro Sugaya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 16/905,695

(22) Filed: Jun. 18, 2020

(65) Prior Publication Data
US 2020/0403541 A1    Dec. 24, 2020

(30) Foreign Application Priority Data
Jun. 20, 2019    (JP) ............... JP2019-114652

(51) Int. Cl.
*H02P 8/18*    (2006.01)
*G03B 17/12*   (2021.01)
(Continued)

(52) U.S. Cl.
CPC ............ *H02P 8/18* (2013.01); *G02B 7/02* (2013.01); *G03B 17/12* (2013.01); *H02P 6/15* (2016.02)

(58) Field of Classification Search
CPC ...... H02P 8/00; H02P 8/14; H02P 8/18; H02P 8/22; H02P 8/24; H02P 8/30; H02P 6/00; H02P 6/006; H02P 6/04; H02P 6/06; H02P 6/12; H02P 6/15; H02P 6/16; H02P 6/17; H02P 6/188; H02P 6/26; H02P 7/00; H02P 7/265; H02P 7/2805; H02P 7/29; H02P 7/2913; H02P 1/00; H02P 1/04;
(Continued)

(56) References Cited

U.S. PATENT DOCUMENTS 8,461,796 B2 * 6/2013 Takai ............... H02P 8/14
                                                     318/400.34
9,762,159 B2    9/2017 Mizuo
(Continued)

FOREIGN PATENT DOCUMENTS

| JP | 6207223 B2 | 10/2017 |
| JP | 6278622 B2 | 2/2018 |
| JP | 2018-191460 A | 11/2018 |

*Primary Examiner* — Antony M Paul
(74) *Attorney, Agent, or Firm* — Cowan, Liebowitz & Latman, P.C.

(57) ABSTRACT

In a motor control device, a rotational phase detection unit detects a rotational phase of a rotor of a stepping motor, and a driving waveform generation unit generates a driving waveform for driving the stepping motor. An advance angle control unit detects a phase difference (advance angle) between a rotational phase of the rotor and a phase of the driving waveform and controls an amplitude or a period of the driving waveform generated by the driving waveform generation unit to perform advance angle control. The advance angle control unit controls an amplitude of the driving waveform by determining a target advance angle based on a variation (advance angle change rate) of an advance angle with respect to a variation of an amplitude in accordance with a change in the advance angle when the amplitude of the driving waveform is changed.

22 Claims, 21 Drawing Sheets

(51) Int. Cl.
*G02B 7/02* (2021.01)
*H02P 6/15* (2016.01)

(58) Field of Classification Search
CPC ...... H02P 1/18; H02P 1/24; H02P 1/28; H02P 1/46; H02P 1/48; H02P 1/465; H02P 4/00; H02P 5/00; G03B 17/12; G02B 7/02
See application file for complete search history.

(56) References Cited

U.S. PATENT DOCUMENTS 10,199,964 B2 2/2019 Mizuo
10,461,675 B2 10/2019 Ishikawa

\* cited by examiner

FIG. 3A
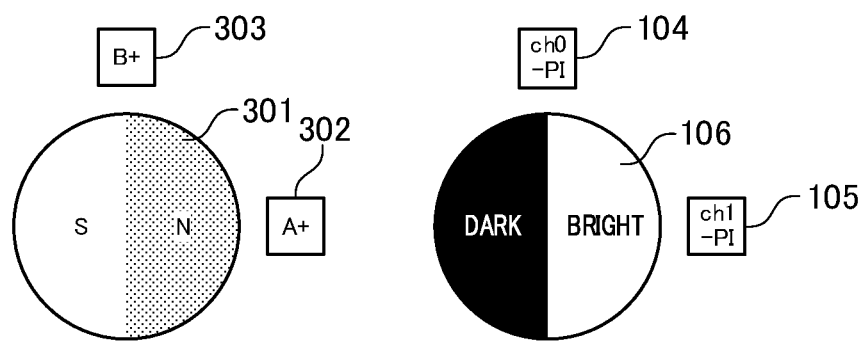
FIG. 3B
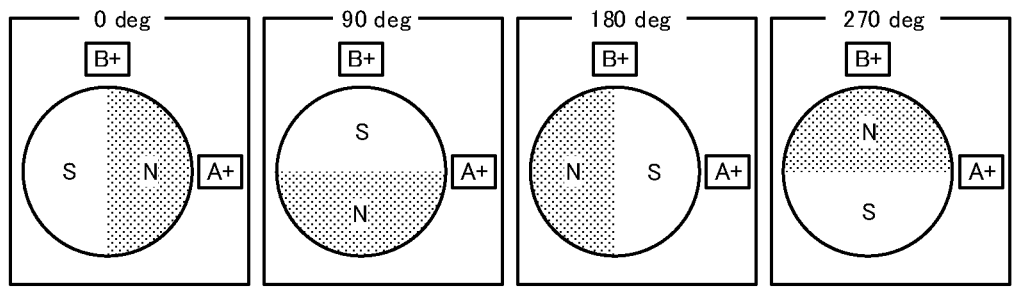
FIG. 3C
FIG. 3D

FIG. 4A
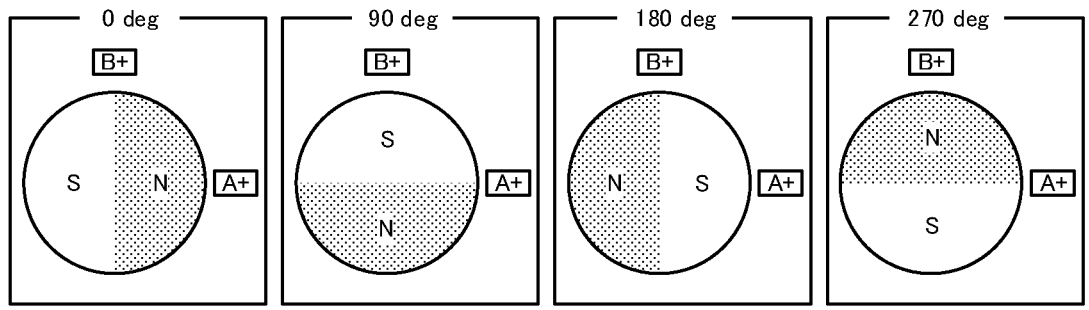
FIG. 4B
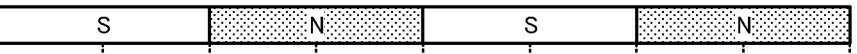
FIG. 4C
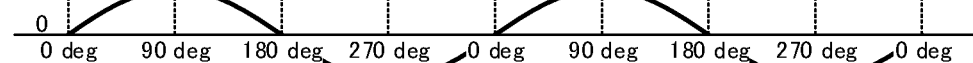
FIG. 4D
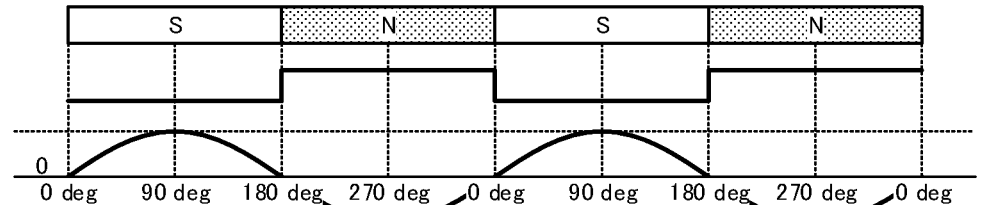
FIG. 4E
FIG. 4F
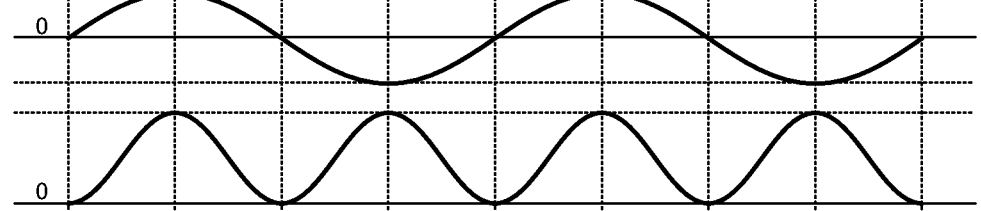
FIG. 4G
FIG. 4H
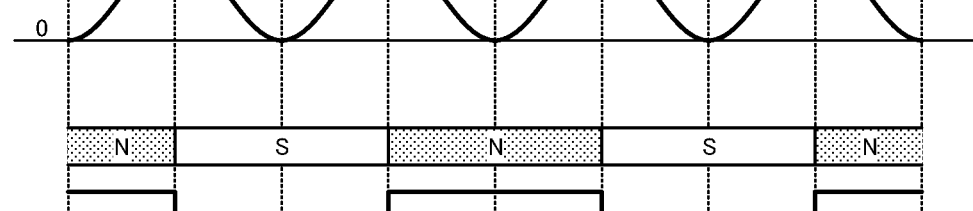
FIG. 4I
FIG. 4J
FIG. 4K
MAXIMUM
EFFICIENCY
FIG. 4L

MAXIMUM EFFICIENCY

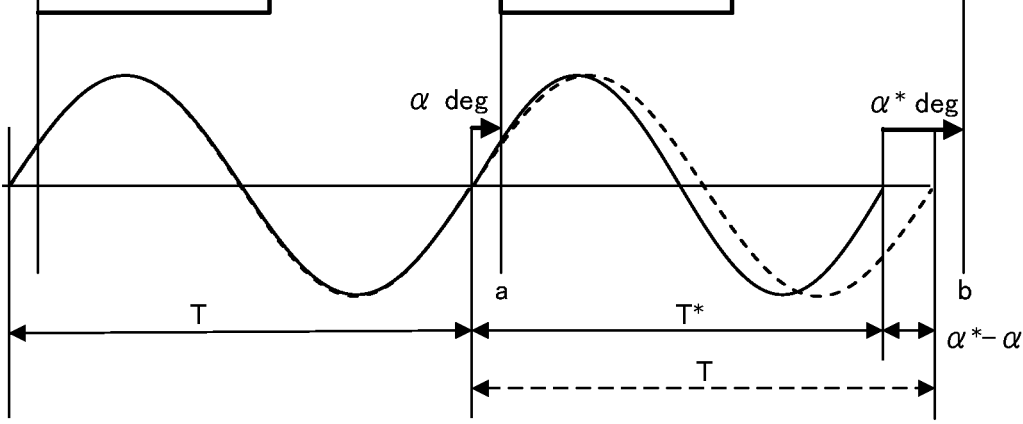

MOTOR CONTROL DEVICE, MOTOR CONTROL METHOD, AND OPTICAL APPARATUS

BACKGROUND OF THE INVENTION

Field of the Invention

The present invention relates to a technique of advance angle control of a stepping motor.

Description of the Related Art

Stepping motors used in various fields can easily perform a high-accuracy positioning operation by open loop control, but there is a possibility of step-out due to a high load or high-speed rotation during open loop control. Consequently, there is a method of controlling an advance angle of a driving waveform with respect to a rotational phase using a rotational phase signal of a motor which is obtained from a position sensor provided in a stepping motor. According to this method, it is possible to maximize rotation efficiency by optimal advance angle control and to realize an increase in speed and power saving.

Japanese Patent No. 6278622 discloses a method of matching an advance angle value to a target value by changing a period of a driving waveform in microstep drive of a stepping motor. Japanese Patent No. 6207223 discloses a method of matching an advance angle value to a target value by changing an amplitude of a driving waveform in microstep drive of a stepping motor.

The technique disclosed in Japanese Patent No. 6278622 is superior in a high speed region of a motor rotation speed, but a detection period of a position sensor increases in a low speed region of a motor rotation speed. For this reason, a fluctuation in period increases, and thus there is a possibility that noise will be generated in a motor. In addition, regarding a target advance angle, data of a relationship between an advance angle and a rotation speed obtained experimentally is stored in a memory, and a stored advance angle amount is set as a target advance angle. However, there is an individual difference between the motor and a moving member connected thereto, and the state of a load changes due to changes with time, a change in temperature, a difference in posture, or the like. For this reason, it is not possible to obtain a control state for obtaining an optimal advance angle at all times using only data of a relationship between an advance angle and a rotation speed obtained experimentally.

Japanese Patent No. 6207223 is based on the assumption that maximum efficiency is obtained when a follow-up delay of a motor with respect to a driving waveform is 90 degrees. However, a phase deviation of a driving waveform due to the generation of a counter electromotive force occurs during the rotation of a motor, and thus a follow-up delay amount for obtaining maximum efficiency changes depending on the state of generation of a counter electromotive force. That is, an advance angle amount to be controlled is affected by a counter electromotive force, and thus the advance angle amount cannot be determined uniformly.

SUMMARY OF THE INVENTION

A motor control device according to an embodiment of the present invention includes a detection unit which detects a rotational phase of a rotor of a stepping motor, a generation unit which generates a driving waveform for driving the stepping motor, and a control unit which detects a phase difference between a rotational phase of the rotor and a phase of the driving waveform and controls an amplitude or a period of the driving waveform to control the phase difference, and the control unit determines a target phase difference from a variation of the phase difference with respect to a variation of the amplitude of the driving waveform to control the amplitude of the driving waveform. at least one processor or circuit is configured to perform a function of at least one of the units.

Further features of the present invention will become apparent from the following description of exemplary embodiments with reference to the attached drawings.

BRIEF DESCRIPTION OF THE DRAWINGS

FIGS. 3A to 3D are diagrams showing relationships between a rotor magnet, an excitation coil, and a rotation detection unit.

FIGS. 4A to 4L are diagrams showing a relationship between a rotor rotational phase and a driving waveform in a case where a follow-up delay does not occur.

FIGS. 7A to 7C are diagrams showing operations of a period control method for a driving waveform.

DESCRIPTION OF THE EMBODIMENTS

Hereinafter, a motor control device according to an embodiment of the present invention will be described in detail with reference to the accompanying drawings. The motor control device can be applied to a system in which an optical member is driven using a motor in a case where the optical member such as a lens and a driving mechanism thereof are included in an optical apparatus or an imaging device. Embodiments will be described after a configuration and operations of a device which are common to the embodiments of the present invention are described.

Figure 1:
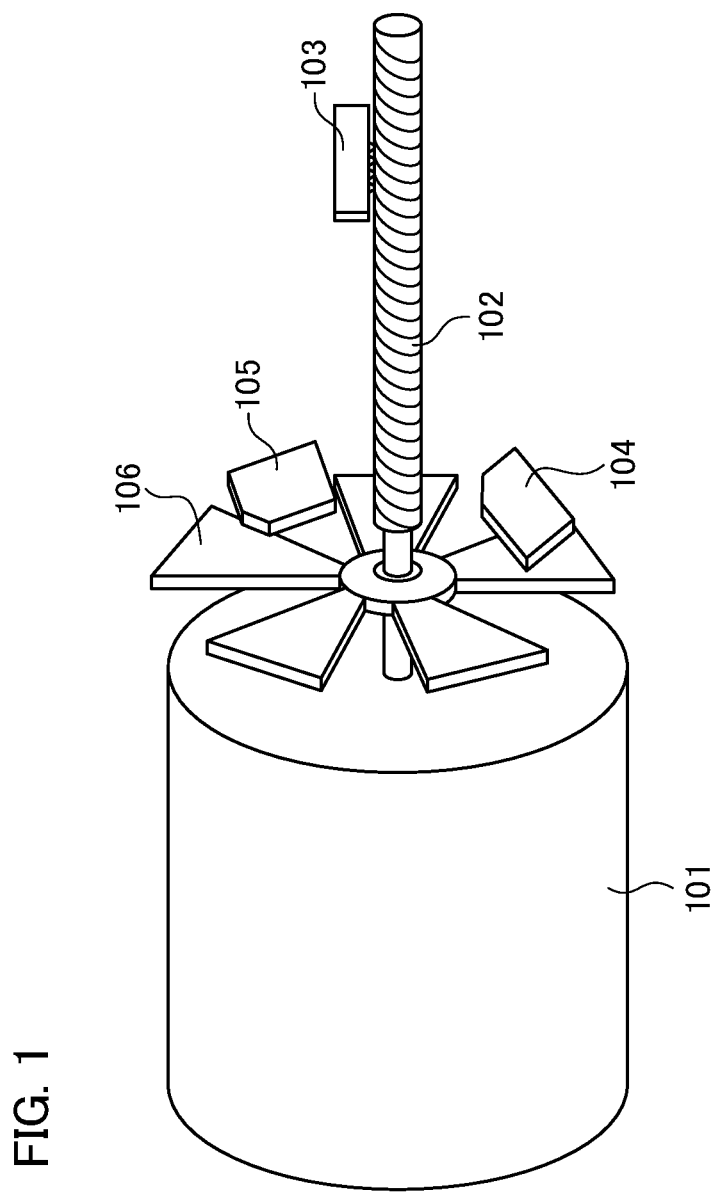
FIG. 1 is a diagram showing a schematic configuration of a stepping motor unit according to an embodiment.

FIG. 1 shows a schematic configuration of a stepping motor unit according to an embodiment of the present invention. A stepping motor (hereinafter, also referred to simply as a motor) 101 includes a rotation axis 102. The rotation axis 102 of the motor serves as a lead screw and engages with a rack 103. A moving member, not shown in the drawing, which is connected to the rack 103 is moved in an axial direction in association with the rotation of the rotation axis 102. Two photointerrupters 104 and 105 detect the rotation of a rotating slit plate 106. Hereinafter, a first photointerrupter 104 will be referred to as ch0-PI, and a second photointerrupter 105 will be referred to as ch1-PI.

The rotating slit plate 106 rotating together with the rotation axis 102 includes a plurality of reflecting portions and transmitting portions having the same width. The number of reflecting portions and the number of transmitting portions are set in accordance with the number of poles of the motor. For example, when the number of poles of the motor is ten, the number of light shielding portions and transmitting portions is set to ten in total. In the present embodiment, a rotational phase of the stepping motor 101 is detected using ch0-PI, ch1-PI, and the rotating slit plate 106.

Figure 2:
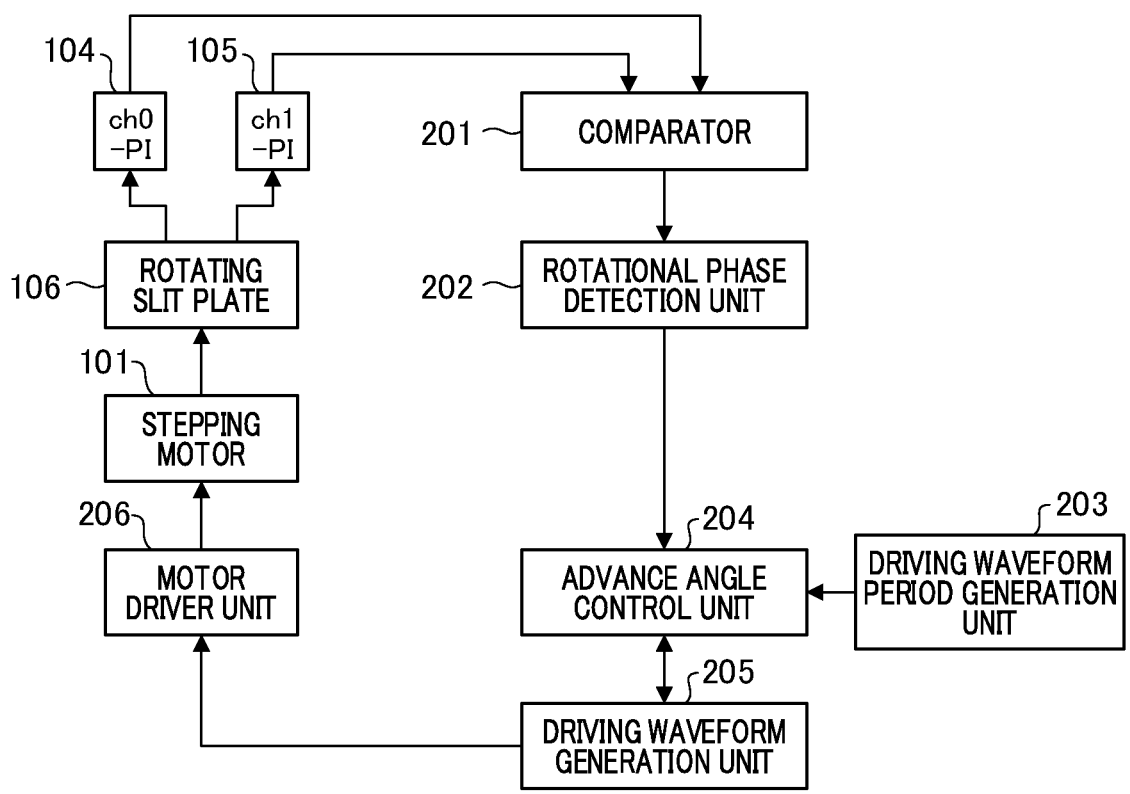
FIG. 2 is a block diagram showing a configuration example of a motor control system.

FIG. 2 is a block diagram showing a configuration example of a motor control system including an electrical circuit for driving. Signals detected using ch0-PI (104), ch1-PI (105), and the rotating slit plate 106 are input to a comparator 201. The comparator 201 acquires an analog input signal detected using ch0-PI and an analog input signal detected using ch1-PI to perform a binarizing process.

A rotational phase detection unit 202 detects a rising edge and a falling edge of a signal binarized by the comparator 201, outputs a rotational phase of the stepping motor 101, and outputs an edge detection signal related to the output of a photointerrupter. This detected signal is referred to as a PI edge detection signal. PI is an abbreviation for "photointerrupter."

A driving waveform period generation unit 203 generates period information of a driving waveform in accordance with a target moving speed of a moving member moving by motor driving. The moving member is an optical member such as a movable lens or an aperture constituting an imaging optical system, or a holding member thereof in application to, for example, an imaging device. The driving waveform period generation unit 203 outputs the generated period information of the driving waveform to an advance angle control unit 204.

The advance angle control unit 204 acquires a PI edge detection signal output from the rotational phase detection unit 202 and performs advance angle control of the motor on the basis of the period information of the driving waveform which is generated by the driving waveform period generation unit 203. The advance angle control unit 204 detects a phase difference (that is, an advance angle of a driving waveform) between a rotational phase of the stepping motor 101 which is output from the rotational phase detection unit 202 and the driving waveform generated by a driving waveform generation unit 205. Further, the advance angle control unit 204 controls an amplitude, a period, and an advance angle of a driving waveform generated by the driving waveform generation unit 205 on the basis of the detected advance angle and the period information from the driving waveform period generation unit 203. Details of processing of the advance angle control unit 204 will be described later.

The driving waveform generation unit 205 generates a sine wave signal based on information output from the advance angle control unit 204 and outputs the generated sine wave signal to the motor driver unit 206. The motor driver unit 206 generates a motor driving signal in accordance with the sine wave signal generated by the driving waveform generation unit 205 to drive the stepping motor 101.

Positional relationships between a rotational phase of the stepping motor 101, the photointerrupters 104 and 105, and the rotating slit plate 106 will be described with reference to FIGS. 3A to 3D. FIGS. 3A to 3D show an example in which the number of poles of motors is simplified to two in order to facilitate the understanding of description.

FIG. 3A shows a rotor magnet 301, an A+ phase excitation coil 302, and a B+ phase excitation coil 303 of the stepping motor 101. The excitation coils 302 and 303 are disposed at positions shifted by an electrical angle of 90 degrees. In addition, the illustration and description of an A− phase excitation coil and a B− phase excitation coil will be omitted.

In the rotating slit plate 106 of FIG. 3A, a light shielding portion (dark portion) and a transmitting portion (bright portion) are expressed. In addition, ch0-PI (104) and ch1-PI (105) are shown for the rotating slit plate 106. In this arrangement, the phase of the N pole of the rotor magnet 301 and the phase of the bright portion of the rotating slit plate 106 match each other, and the phase of the S pole of the rotor magnet 301 and the phase of the dark portion of the rotating slit plate 106 match each other. In addition, ch0-PI (104) is disposed at a position corresponding to a phase shifted by 90 degrees with respect to the A+ phase excitation coil, and ch1-PI (105) is disposed at a position corresponding to a phase shifted by 90 degrees with respect to the B+ phase excitation coil.

FIG. 3B is a schematic diagram showing a state corresponding to a rotation angle of the rotor magnet 301. Four states corresponding to 0 degrees, 90 degrees, 180 degrees, and 270 degrees are shown as rotation angles. In FIG. 3C, a rotational phase of the rotor magnet 301 with respect to the position of ch0-PI (104) is represented by an S pole/an N pole, and changes in a detected signal of ch0-PI are shown. In FIG. 3D, a rotational phase of the rotor magnet 301 with respect to the position of ch1-PI (105) is represented by an S pole/an N pole, and changes in a detected signal of ch1-PI are shown.

Advance angle control in the present embodiment will be described with reference to FIG. 4 to FIG. 6. FIGS. 4A to 4L are diagrams showing a relationship between a rotor rotational phase and a driving waveform in a case where a follow-up delay of the rotor magnet 301 does not occur. Hereinafter, as a rotation direction of a motor, a direction in which the rotor magnet 301 shown in each drawing is rotated clockwise is set to be a forward rotation direction, and a counterclockwise direction is defined as a backward rotation direction.

FIG. 4A is a diagram showing a positional relationship between a rotor and an excitation coil during forward rotation of the rotor magnet 301 and corresponding to FIG. 3B. Four states corresponding to 0 degrees, 90 degrees, 180 degrees, and 270 degrees are shown as rotation angles of the rotor magnet 301. FIG. 4B shows a rotational phase of an S pole/an N pole of the rotor magnet 301 from the position of ch0-PI (104) at each rotation angle. FIG. 4C shows changes in a detected signal of ch0-PI (104).

FIG. 4D shows the magnitude of a torque in a rotation direction at the position of an A+ phase excitation coil 302. In a case where the A+ phase excitation coil 302 is excited to an N pole, a torque value in a case where a torque in a positive direction is applied to the rotor magnet 301 is set to be a positive value. In this state, a maximum torque in a positive direction is generated when a rotation angle is 90 degrees, and a maximum torque in a negative direction is generated when a rotation angle is 270 degrees. Further, in cases where a rotation angle is 0 degrees and 180 degrees, the rotor magnet 301 and the A+ phase excitation coil 302 repel each other or pull against each other, and thus a torque in a rotation direction is not generated.

FIG. 4E shows a driving waveform of the A+ phase excitation coil 302 with respect to a rotation angle of the rotor magnet 301, and a + side represents an excitation state of an N pole. The setting of a horizontal axis is the same as in FIG. 4D. A maximum excitation (N pole) state is set on a + side when a rotation angle of the rotor magnet 301 is 90 degrees, and a maximum excitation (S pole) state is set on a − side when a rotation angle is 270 degrees. The phase of an excitation waveform is determined so that excitation does not occur when a rotation angle is 0 degrees or 180 degrees. FIG. 4F shows changes in a torque in a rotation direction which is obtained through excitation in a driving waveform shown in FIG. 4E. The setting of a horizontal axis is the same as in FIG. 4D.

FIG. 4G shows a rotational phase of an S pole/an N pole of the rotor magnet 301 from the position of ch1-PI (105) at each rotation angle of the rotor magnet 301. FIG. 4H shows a detected signal of ch1-PI (105). FIG. 4I shows the magnitude of a torque in a rotation direction at the position of the B+ phase excitation coil 303. The setting of a horizontal axis is the same as in FIG. 4D. In a case where the B+ phase excitation coil 303 is excited to an N pole, a torque value in a case where a torque in a positive direction is applied to the rotor magnet 301 is set to be a positive value. In this state, a maximum torque in a positive direction is generated when a rotation angle is 0 degrees, and a maximum torque in a negative direction is generated when a rotation angle is 180 degrees. Further, in cases where a rotation angle is 90 degrees and 270 degrees, the rotor magnet 301 and the B+ phase excitation coil 303 repel each other or pull against each other, and thus a torque in a rotation direction is not generated.

FIG. 4J shows a driving waveform of the B+ phase excitation coil 303 with respect to a rotation angle of the rotor magnet 301, and a + side represents an excitation state of an N pole. The setting of a horizontal axis is the same as in FIG. 4D. A maximum excitation (N pole) state is set on a + side when a rotation angle of the rotor magnet 301 is 0 degrees, and a maximum excitation (S pole) state is set on a − side when a rotation angle is 180 degrees. The phase of an excitation waveform is determined so that excitation does not occur when a rotation angle is 90 degrees or 270 degrees. FIG. 4K shows changes in a torque in a rotation direction which is obtained through excitation in a driving waveform shown in FIG. 4J. The setting of a horizontal axis is the same as in FIG. 4D.

FIG. 4L shows a combined torque, and a torque obtained by combining a torque generated in an A phase (see FIG. 4F) and a torque generated in a B phase (see FIG. 4K) is a torque of the stepping motor 101. A torque with maximum efficiency is obtained by matching a phase of a driving waveform to a rotation angle of the rotor magnet 301.

In the above, description has been given on the assumption that a follow-up delay of the rotor magnet 301 has not occurred with respect to driving waveforms of the A+ phase excitation coil 302 and B+ phase excitation coil 303 or a delay is negligible. However, a counter electromotive force is generated in a motor in a rotating state, and thus a phase delay occurs in a driving waveform actually supplied to an excitation coil. A relationship between a rotor rotational phase and a driving waveform in a state where a follow-up delay of the rotor magnet 301 occurs due to a phase deviation is shown in FIGS. 5A to 5L. Since FIGS. 5A to 5L correspond to FIGS. 4A to 4L, differences from FIGS. 4A to 4L will be described, and description of FIGS. 5B, 5C, 5D, 5G, 5H, and 5I will be omitted.

Figures 5A, 5B, 5C, 5D, 5E, 5F, 5G, 5H, 5I, 5J, 5K, 5L:
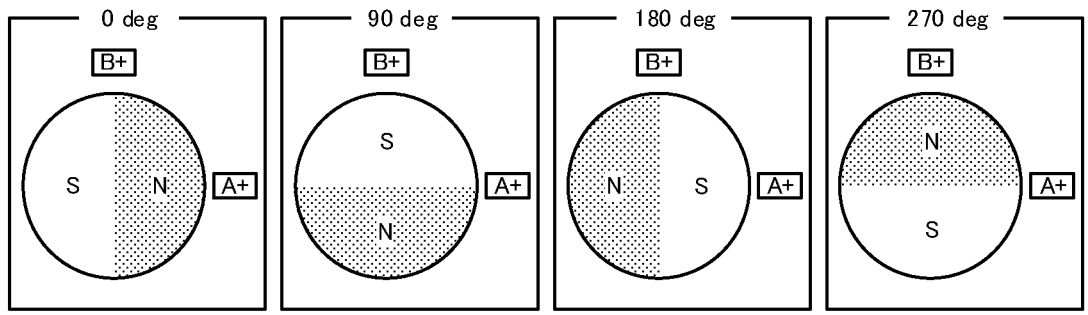
FIGS. 5A to 5L are diagrams showing a relationship between a rotor rotational phase and a driving waveform in a state where a follow-up delay occurs.

In FIG. 5E, a waveform (a) represents an output waveform of the motor driver unit 206 to the A+ phase excitation coil 302, and a waveform (b) represents a driving waveform actually supplied to the A+ phase excitation coil. A delay in a phase a occurs in the waveform (b) with respect to the waveform (a). In FIG. 5F, a waveform (a) represents changes in a torque corresponding to the waveform (a) in FIG. 5E, and a waveform (b) represents changes in a torque corresponding to the waveform (b) in FIG. 5E.

Further, in FIG. 5J, a waveform (a) represents an output waveform of the motor driver unit 206 to the B+ phase excitation coil 303, and a waveform (b) represents a driving waveform actually supplied to the B+ phase excitation coil. A delay in a phase a occurs in the waveform (b) with respect to the waveform (a). In FIG. 5K, a waveform (a) represents changes in a torque corresponding to the waveform (a) in FIG. 5J, and a waveform (b) represents changes in a torque corresponding to the waveform (b) in FIG. 5J.

As shown in FIGS. 5F and 5K, a torque in a rotation direction due to the A+ phase excitation coil 302 and the B+ phase excitation coil 303 is in the state of a waveform (b). A torque obtained by combining an A phase and a B phase with each other is as shown in FIG. 5L and is in the state of (b) instead of the state of (a) indicating maximum efficiency. That is, this is a torque state in which efficiency is reduced with respect to the state of (a).

As described above, the efficiency of a torque is reduced due to a phase deviation of a driving waveform, but a torque is controlled by advancing a phase of a driving waveform by this phase deviation in the present embodiment. Hereinafter, advance angle control processing will be described.

FIGS. 6A to 6L are diagrams showing processing for performing correction through advance angle control with respect to a reduction in torque efficiency due to a phase deviation described in FIGS. 5A to 5L. Only differences from FIGS. 4A to 4L and FIGS. 5A to 5L will be described, and description of FIGS. 6B to 6D and 6G to 6I will be omitted.

Figures 6A, 6L:
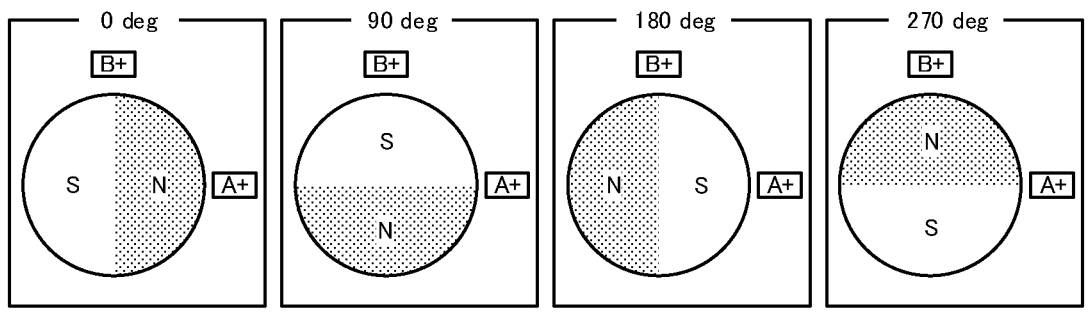
FIGS. 6A to 6L are diagrams showing correction processing performed by advance angle control.
Figure 6B:
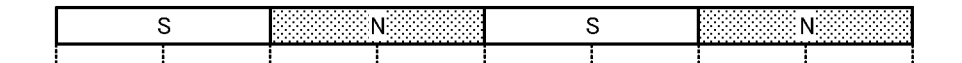
Figure 6C:
Figure 6D:
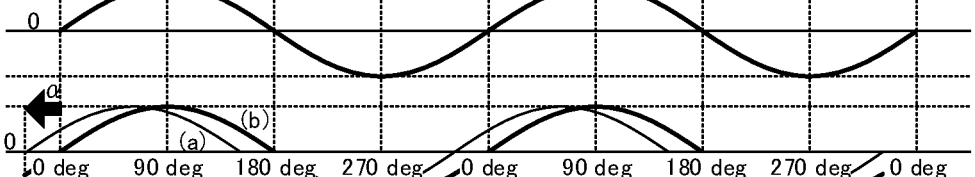
Figure 6E:
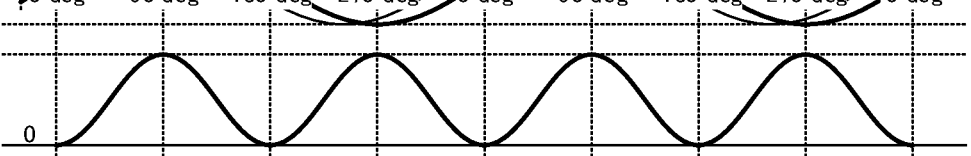

In FIG. 6E, a waveform (a) represents an output waveform of the motor driver unit 206 to the A+ phase excitation coil 302, and a waveform (b) represents a driving waveform actually supplied to the A+ phase excitation coil 302.

Control of advancing the output waveform of the motor driver unit 206 to the A+ phase excitation coil 302 by a phase a is performed. The driving waveform actually supplied to the A+ phase excitation coil 302 is the waveform (b), and phases of rotor magnetic forces can be made to match each other. That is, the phase of the waveform (b) in FIG. 6E matches that of the waveform shown in FIG. 6D.

Figure 6F:
Figure 6G:
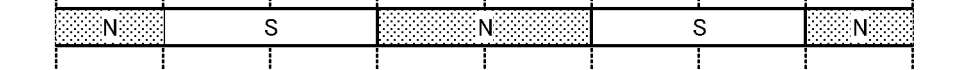
Figure 6H:
Figure 6I:
Figure 6J:
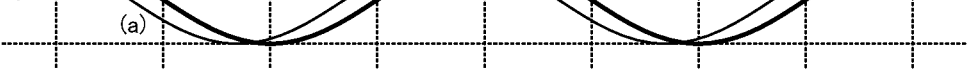

Further, in FIG. 6J, a waveform (a) represents an output waveform of the motor driver unit 206 to the B+ phase excitation coil 303, and a waveform (b) represents a driving waveform actually supplied to the B+ phase excitation coil 303. Control of advancing the output waveform of the motor driver unit 206 to the B+ phase excitation coil 303 by a phase a is performed. The driving waveform actually supplied to the B+ phase excitation coil 303 is the waveform (b), and phases of rotor magnetic forces can be made to match each other. That is, the phase of the waveform (b) in FIG. 6J matches that of the waveform shown in FIG. 6I.

Figure 6K:
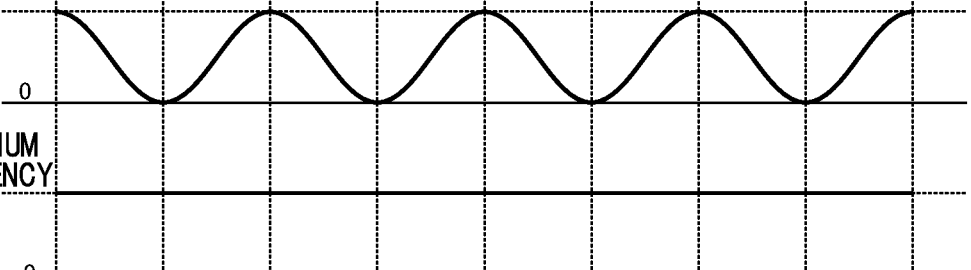

FIG. 6F shows changes in a torque in a rotation direction due to an A+ phase excitation coil, and FIG. 6K shows changes in a torque in a rotation direction due to a B+ phase excitation coil. A torque obtained by combining a torque generated in an A phase and a torque generated in a B phase is as shown in FIG. 6L, and a torque with maximum efficiency is obtained. That is, a torque can be controlled by controlling a phase (advance angle) of a driving waveform which is output from the motor driver unit 206.

Next, an advance angle control method will be described with reference to FIGS. 7A to 7C and FIGS. 8A to 8C. The advance angle control method includes a period control method for controlling an advance angle by changing a period of a driving waveform and an amplitude control method of controlling an advance angle by changing an amplitude of a driving waveform.

FIGS. 7A to 7C are diagrams showing operations of a period control method for a driving waveform. FIG. 7A shows a rotational phase of the rotor magnet 301 from the position of ch0-PI (104). FIG. 7B shows an output waveform of ch0-PI in this case, and FIG. 7C shows a motor driving signal of an A phase. In addition, this description is on the basis of ch0-PI, but the same relationship is established for ch1-PI (105). In this case, FIG. 7A shows a rotational phase of the rotor magnet 301 from the position of ch1-PI (105). FIG. 7B shows an output waveform of ch1-PI in this case, and FIG. 7C shows a motor driving signal of a B phase. Further, in FIG. 7C, a waveform of a dashed line is a waveform in a case where an advance angle is not retracted, and a waveform of a solid line is a waveform in a case where an advance angle is retracted.

A timing (a) shown in FIGS. 7A to 7C is a timing corresponding to a boundary between an N pole and an S pole of the rotor magnet 301, and the next timing is represented by (b). It is assumed that the advance angle control unit 204 detects a (degrees) as an advance angle at the timing (a). The current period of a driving waveform is denoted by T. In a case where a target advance angle $\alpha^*$ (degrees) is set, the advance angle control unit 204 calculates a period (denoted by T*) obtained by correcting the current period T of the driving waveform by "$\alpha^*-\alpha$." That is, a relationship of "$T^*=T-(\alpha^*-\alpha)$" is established. The period of the driving waveform (dashed line) before correction is T, and the period of the driving waveform (solid line) after correction is T*. The advance angle control unit 204 outputs the corrected period T* to the driving waveform generation unit 205 as period information. An advance angle of the driving waveform is controlled to the target advance angle $\alpha^*$ at the timing (b) by changing the period of the driving waveform from T to T*.

Figures 8A, 8B, 8C:
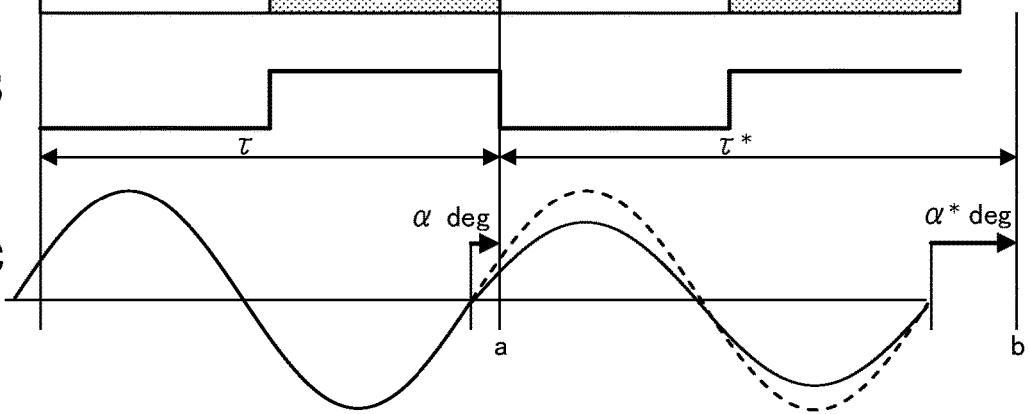
FIGS. 8A to 8C are diagrams showing operations of an amplitude control method for a driving waveform.

FIGS. 8A to 8C are diagrams showing operations of an amplitude control method for a driving waveform. FIGS. 8A to 8C respectively show a rotational phase of the rotor magnet 301, an output waveform of ch0-PI, and a motor driving control signal, similar to FIGS. 7A to 7C. It is assumed that the advance angle control unit 204 detects a (degrees) as an advance angle at a timing (a) of FIGS. 8A to 8C. On the other hand, in a case where a target advance angle $\alpha^*$ (degrees) is set, the advance angle control unit 204 changes the current amplitude of a driving waveform. That is, the current amplitude m is changed to m*. For example, in a case where the target advance angle $\alpha^*$ is set to be larger than the current advance angle $\alpha$, the amplitude m* is changed to a value smaller than the amplitude m. The amplitude of the driving waveform (dashed line) before change is m, and the amplitude of the driving waveform (solid line) after change is m*. The follow-up of a rotor is delayed due to a reduction in an amplitude, and thus a rotation period is changed from $\tau$ to $\tau^*$ ($\tau<\tau^*$). As a result, an advance angle reaches the target advance angle $\alpha^*$. Further, in a case where the target advance angle $\alpha^*$ is set to be smaller than the current advance angle $\alpha$, the amplitude m* is changed to a value larger than the amplitude m, and control is performed in a direction in which a delay of the follow-up of the rotor is reduced.

Advance angle control will be described in detail in the following embodiments on the basis of a method of retracting an advance angle in the advance angle control unit 204.

First Embodiment

Figure 9A:
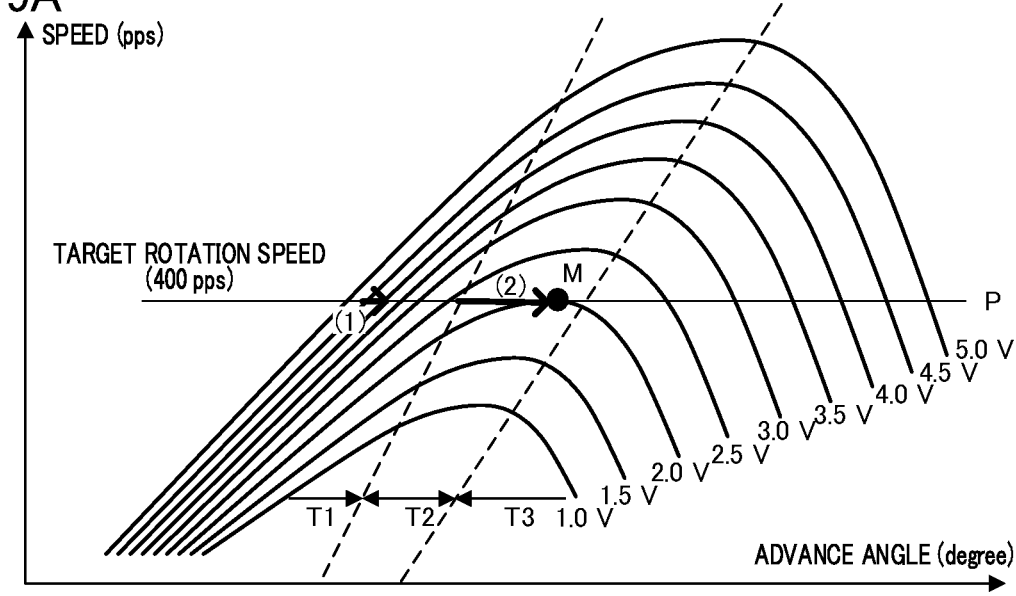
FIGS. 9A to 9C are diagrams showing a relationship between an advance angle and a speed, a relationship between an amplitude and an advance angle, and a relationship between an amplitude and an advance angle change rate.
Figure 9B:
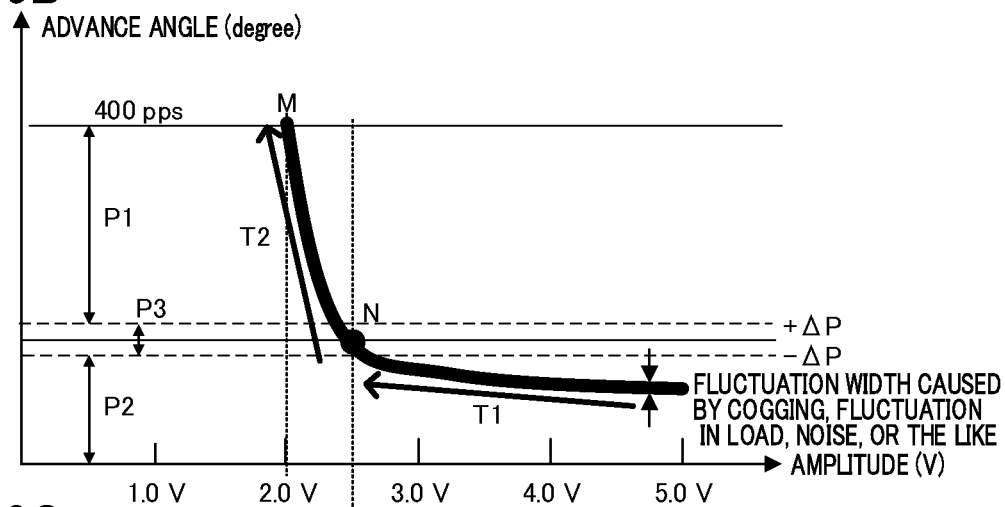
Figure 9C:
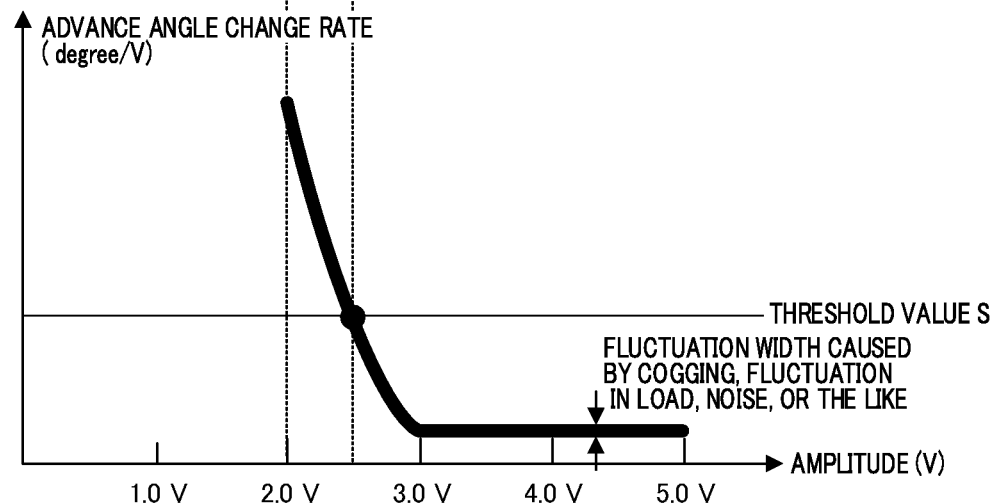

In the present embodiment, an example of an amplitude control method will be described with regard to a method of determining a target advance angle which is a target phase difference. FIGS. 9A to 9C are diagrams showing a relationship between an advance angle and a speed, a relationship between an amplitude and an advance angle, and a relationship between an amplitude and an advance angle change rate. FIG. 9A is a diagram showing a relationship between an advance angle of a driving waveform with respect to a rotational phase of the rotor magnet 301 and a drivable rotation speed when a horizontal axis represents the advance angle (unit: degrees) and a vertical axis represents the rotation speed (unit: pulses per second). In each graph, amplitudes (unit: volts) of driving waveforms output from the motor driver unit 206 are shown in increments of 0.5 V in a range of 1.0 V to 5.0 V.

A region T1 shown in FIG. 9A is a linear region in which a relationship between an advance angle and a speed is fixed in a case where the advance angle is increased from 0 degrees. A region T2 is a region in which an increase in speed is saturated when an advance angle is further increased from the region T1. A region T3 is a region in which a speed rapidly decreases in a case where an advance angle is further increased from the region T2.

Here, a case where a target rotation speed is set to 400 pps and a driving amplitude is gradually decreased from a maximum value of 5.0 V is assumed. A line P is a straight line equivalent to 400 pps and parallel to the horizontal axis. When the driving amplitude is decreased from 5 V, an advance angle changes gradually in association with a change in amplitude in the linear region T1 in which an advance angle and a speed have a linear relationship. This is indicated by an arrow (1) on the line P in FIG. 9A. This state continues up to approximately 2.5 V. When a driving amplitude is further decreased, the advance angle reaches the region T2 in which a relationship between an advance angle and a speed is saturated. In the region T2, as indicated by an arrow (2) on the line P in FIG. 9A, a change in an advance angle with respect to a change in a driving amplitude becomes large rapidly, and the advance angle eventually reaches a point (referred to as M) where a speed is saturated. An advance angle for obtaining maximum efficiency is set at the point M where a speed is saturated.

FIG. 9B is a diagram showing a relationship between an amplitude (unit: volts) and an advance angle (unit: degrees) when a horizontal axis represents the amplitude and a vertical axis represents the advance angle. FIG. 9B shows an advance angle with respect to an amplitude of a driving waveform by following a line P indicating a target rotation speed (400 pps). FIG. 9C is a diagram showing a relationship between an amplitude (unit: volts) and an advance angle change rate (unit: degrees/V) when a horizontal axis represents the amplitude and a vertical axis represents the advance angle change rate. The advance angle change rate represents a ratio of a variation in an advance angle to a variation in an amplitude.

In FIGS. 9B and 9C, when an amplitude is decreased from 5.0 V, a rate of a change in advance angle is small up to approximately 2.5 V (see the region T1). A rate of a change in advance angle rapidly increases from 2.5 V to 2.0 V (see the region T2). That is, in the region T2, it can be understood that an advance angle changes greatly with a small change in voltage. A point N shown in FIG. 9B is equivalent to a position where a variation in advance angle changes rapidly. When a variation in advance angle is detected and an advance angle corresponding to the point N where the variation becomes large rapidly is set to a target advance angle, maximum efficiency is obtained within a range having an error of 0.5 V or less. In addition, for convenience of description, amplitudes of driving waveforms are shown in increments of 0.5 V, but actual control is performed in smaller increments.

Figure 10:
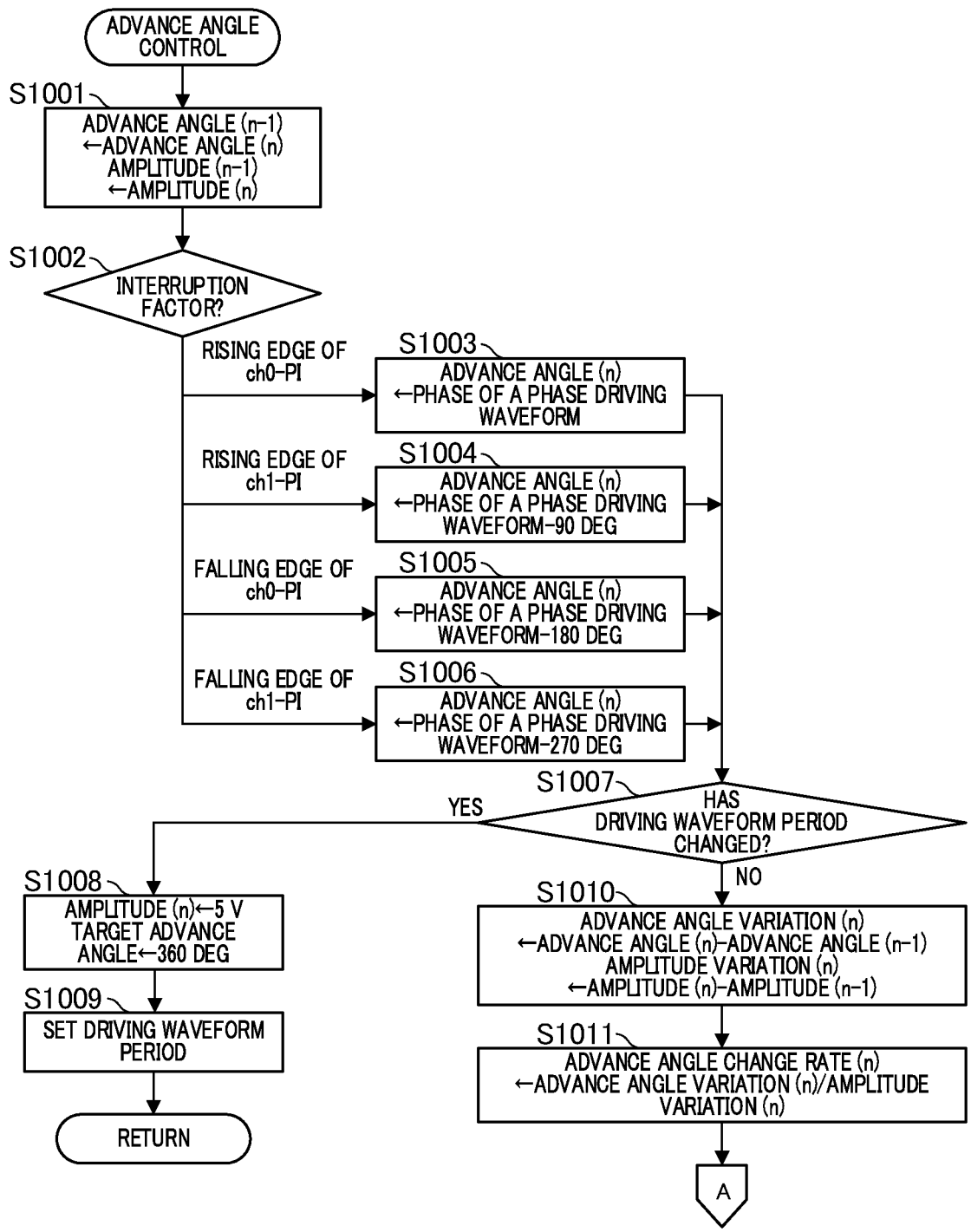
FIG. 10 is a flowchart showing processing performed by an advance angle control unit according to a first embodiment.
Figure 11:
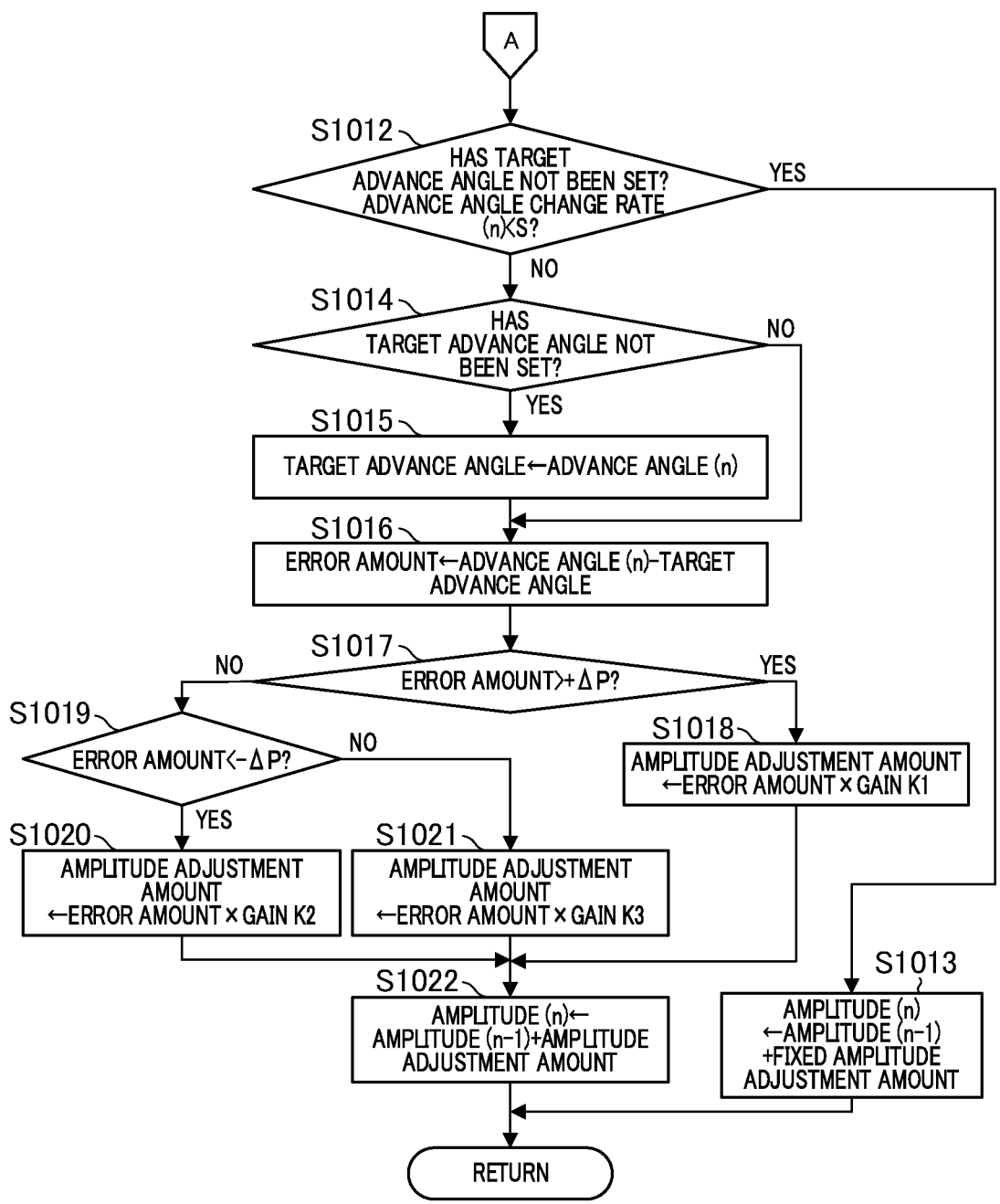
FIG. 11 is a flowchart showing processing subsequent to FIG. 10.

Processing performed by the advance angle control unit 204 will be described with reference to FIGS. 10 and 11. FIGS. 10 and 11 are flowcharts showing processing for searching for a target advance angle (target phase difference) described in FIG. 9. The advance angle control unit 204 executes the following processing on the basis of a PI edge detection signal which is output from the rotational phase detection unit 202.

First, the advance angle control unit 204 backs an advance angle calculated in the previous processing and an amplitude of a driving waveform which is calculated in the previous processing up to an advance angle (n−1) and an amplitude (n−1), respectively, in S1001 of FIG. 10. The advance angle (n−1) and the amplitude (n−1) respectively represent an advance angle value and an amplitude value acquired in an n−1-th process. In S1002, processing for determining an interruption factor is executed. This step branches into S1003 to S1006 in accordance with an edge detection factor of a PI edge detection signal. The processing proceeds to S1003 with the detection of a rising edge of ch0-PI (104) and proceeds to S1004 with the detection of a rising edge of ch1-PI (105). The processing proceeds to S1005 with the detection of a falling edge of ch0-PI (104) and to S1006 with the detection of a falling edge of ch1-PI (105). An advance angle is detected in the processes of S1003 to S1006. An advance angle (n) represents an advance angle value acquired in an n-th process.

A relationship between a rotor rotational phase and a driving waveform in a case where a follow-up delay of a rotor does not occur is as follows.

A phase angle of 0 degrees in a rising edge of ch0-PI (104)
A phase angle of 90 degrees in a rising edge of ch1-PI (105)
A phase angle of 180 degrees in a falling edge of ch0-PI (104)
A phase angle of 270 degrees in a falling edge of ch1-PI (105)

Since an advance angle is a deviation from the phase angle, the current advance angle can be acquired through the processes of S1003 to S1006 in accordance with an edge detection factor. For example, in S1004, a value obtained by subtracting a phase angle of 90 degrees from a phase of an A phase driving waveform is detected as an "advance angle (n)".

After the processes of S1003 to S1006 are performed, the processing proceeds to the process of S1007. In S1007, processing for determining whether or not period information input from the driving waveform period generation unit 203 has changed is executed. In a case where a driving waveform period has changed due to a change in period information, the processing proceeds to S1008. In a case where period information has not changed, the processing proceeds to S1010.

In S1008, processing for initializing an amplitude of a driving waveform and a target advance angle is performed. In the initialization, an amplitude (n) is updated to a maximum voltage of 5 V, and a target advance angle is set to 360 degrees. Here, 360 degrees means that a target advance angle has not yet been set. In the present embodiment, a maximum voltage is defined as 5 V. However, this is not limiting, and a voltage capable of rotating a motor in a set driving period may be set. In S1009, a period of a driving waveform is set. In addition, the processing proceeds to return processing.

The process of S1010 and the subsequent processes are processing for searching for a target advance angle in the present embodiment. In S1010, the advance angle control unit 204 calculates an "advance angle variation (n)" generated in a PI edge detection period from a difference between an "advance angle (n)" detected this time and an "advance angle (n−1)" detected previously. The advance angle control unit 204 further calculates an "amplitude variation (n)" generated in a PI edge detection period from a difference between an "amplitude (n)" of a driving waveform which is set this time and an "amplitude (n−1)" of a driving waveform which is set previously. Next, in S1011, the advance angle control unit 204 calculates an advance angle change rate (n) by the following Expression (1) from the calculated advance angle variation (n) and amplitude variation (n).

Advance angle change rate (*n*)=advance angle variation (*n*)/amplitude variation (*n*)   (Expression 1)

After the process of S1011 is performed, the processing proceeds to S1012 in FIG. 11, and the advance angle control unit 204 determines whether a target advance angle has not been set (360 degrees) and an advance angle change rate is less than a threshold value (referred to as S). Here, the setting of the threshold value S will be supplementarily described using FIG. 9. Ideally, a target advance angle is set to an advance angle value corresponding to an advance angle point (M) at which a speed is saturated. However, an advance angle change rate fluctuates due to the influence of cogging of the stepping motor 101, a fluctuation in load applied to the stepping motor 101, or noise of a driving waveform as shown in FIG. 9C. It is necessary to provide a margin based on the fluctuation. That is, as the advance angle variation (n) in (Expression 1), an advance angle change rate (n) calculated in a case where an advance angle fluctuation component due to the above-described factor is set is set to be an advance angle change rate generated due to the above-described factor. Consequently, an advance angle change rate obtained by adding the advance angle change rate generated due to the above-described factor to an advance angle change rate (n) in a region T1 is set as a threshold value S.

In a case where it is determined in S1012 that a target advance angle has not been set and an advance angle change rate is less than a threshold value, the processing proceeds to the process of S1013. In a case where a determination condition is not satisfied, that is, in a case where it is determined that a target advance angle has been set or an advance angle change rate is equal to or greater than a threshold value S, the processing proceeds to the process of S1014.

In S1013, the advance angle control unit 204 corrects the "amplitude (n)" of the driving waveform by a fixed amplitude adjustment amount. The fixed amplitude adjustment amount is an adjustment amount by which a measurement resolution required to search for a target advance angle can be obtained. The advance angle control unit 204 outputs period information designated by the driving waveform period generation unit 203 and amplitude information of a driving waveform which is set this time to the driving waveform generation unit 205 to control the driving waveform. After the process of S1013 is performed, the processing proceeds to return processing.

In S1014, the advance angle control unit 204 determines whether a target advance angle has not been set (360 degrees). In a case where a target advance angle has not been set, the processing proceeds to S1015, and the advance angle control unit 204 sets an "advance angle (n)" at that time as a target advance angle.

After the process of S1015 is performed, the processing proceeds to the process of S1016. Alternatively, in a case where a target advance angle has been set in S1014, the processing proceeds to S1016. The processes of S1016 to S1022 are advance angle control processing using an amplitude control method in the present embodiment.

In S1016, the advance angle control unit 204 calculates a deviation amount of the detected advance angle (n) with respect to the target advance angle as an error amount. That is, a relationship of "error amount=advance angle (n)−target advance angle" is established. Subsequently, in S1017, the advance angle control unit 204 determines whether or not the calculated error amount exceeds a threshold value. In FIG. 9B, ΔP represents a threshold value, and P3 represents a region in which an error amount is between −ΔP and +ΔP on the basis of the point N. In addition, P1 is a region in which an error amount is greater than +ΔP on the basis of the point N, and P2 is a region in which an error amount is less than −ΔP (large in a negative direction) on the basis of the point N. In a case where it is determined that an error amount exceeds +ΔP (the region P1 in FIG. 9B), an amplitude has to be rapidly increased and controlled so as not to exceed a saturation point (M). Consequently, the processing proceeds to S1018, and the advance angle control unit 204 selects a large gain (referred to as K1) as a gain of an amplitude adjustment amount and calculates a large amplitude adjustment amount by multiplying an error amount by the gain K1.

On the other hand, in a case where it is determined in S1017 that the calculated error amount is equal to or less than +ΔP, the processing proceeds to the process of S1019. In S1019, the advance angle control unit 204 determines whether or not the calculated error amount is less than −ΔP. In a case where it is determined that the error amount is less than −ΔP (the region P2 in FIG. 9B), retraction to a target advance angle is being performed, and thus the advance angle control unit 204 performs control of rapidly reducing an amplitude in order to speed up the retraction. That is, in S1020, the advance angle control unit 204 selects a large gain (referred to as K2) as a gain of an amplitude adjustment amount and calculates a large amplitude adjustment amount by multiplying an error amount by the gain K2. The region P2 in FIG. 9B in which an error amount is less than −ΔP is a region in which an advance angle variation for an amplitude variation is decreased, with respect to the region P1 in which an error amount exceeds +ΔP. For this reason, the gain K2 is set to a value larger than the gain K1.

In a case where it is determined in S1019 that an error amount is equal to or greater than −ΔP (the region P3 in FIG. 9B), retraction to a target advance angle has been completed, and thus the advance angle control unit 204 performs control so that an advance angle is set to be in a stable state in the vicinity of the target advance angle. In S1021, the advance angle control unit 204 selects a small gain (referred to as K3) as a gain of an amplitude adjustment amount and calculates a small amplitude adjustment amount by multiplying an error amount by the gain K3.

After an amplitude adjustment amount is set in S1018, S1020, and S1021, the processing proceeds to the process of S1022. In S1022, the advance angle control unit 204 corrects the "amplitude (n−1)" of the driving waveform by the set amplitude adjustment amount to calculate an "amplitude (n)". The advance angle control unit 204 outputs period information designated by the driving waveform period generation unit 203 and amplitude information of a driving waveform which is set this time to the driving waveform generation unit 205 to control the driving waveform. After the process of S1022 is performed, the processing proceeds to return processing.

Here, the range of ±ΔP and the setting of a gain will be supplementarily described using FIG. 9. An advance angle fluctuates due to the influence of a fluctuation in load caused by cogging of the motor, or the like as shown in FIG. 9B. An excessive increase in responsiveness to the fluctuation in load leads to a concern that control may become unstable. Consequently, the range of ±ΔP and a gain are set so as not to follow a fluctuation in advance angle caused by a fluctuation in load due to cogging of the motor, or the like.

In the present embodiment, as a method of determining a target advance angle (target phase difference) during the control of an advance angle, an advance angle for setting an advance angle change rate (n) to be equal to or greater than a threshold value (equal to or greater than S) is set as a target advance angle. According to the advance angle control using the method of setting a target advance angle and the amplitude control method, even when a load varies due to an individual difference (variation) between a motor and a moving member, changes with time, a change in temperature, a difference in posture, or the like, control is performed by searching for an optimal advance angle. Accordingly, it is possible to obtain an efficient driving torque at all times.

In the present embodiment, a configuration in which a photointerrupter and a rotating slit plate are used to detect a rotational phase of the rotor magnet 301 has been described. This is not limiting, and a Hall sensor or an MR sensor may be used to detect rotation. In addition, an example of a binary signal has been described as a signal for position detection, but a sine wave-shaped signal may be used. In this case, an advance angle is detected by comparing a phase of a sine wave of a position detection signal and a phase of a sine wave of a driving signal with each other. These matters are the same as those in embodiments to be described later.

Second Embodiment

Next, a second embodiment of the present invention will be described. In the present embodiment, as a method of determining a target advance angle by the advance angle control unit 204, an example in which an advance angle for which it is determined that an advance angle change rate has changed in a direction in which the advance angle change rate continuously increases is set as a target advance angle is described. Description of the same matters as those in the first embodiment will be omitted using reference numerals and signs that have already been described in the present embodiment. A method of omitting description is the same as in embodiments to be described later.

Processing performed by the advance angle control unit 204 of the present embodiment will be described with reference to FIGS. 12 and 13. In flowcharts shown in FIGS. 12 and 13, the process of S1001 in FIG. 10 and the process of S1012 in FIG. 11 are respectively changed to the process of S1101 and the process of S1112. Hereinafter, only S1101 and S1112 which are differences will be described.

Figure 12:
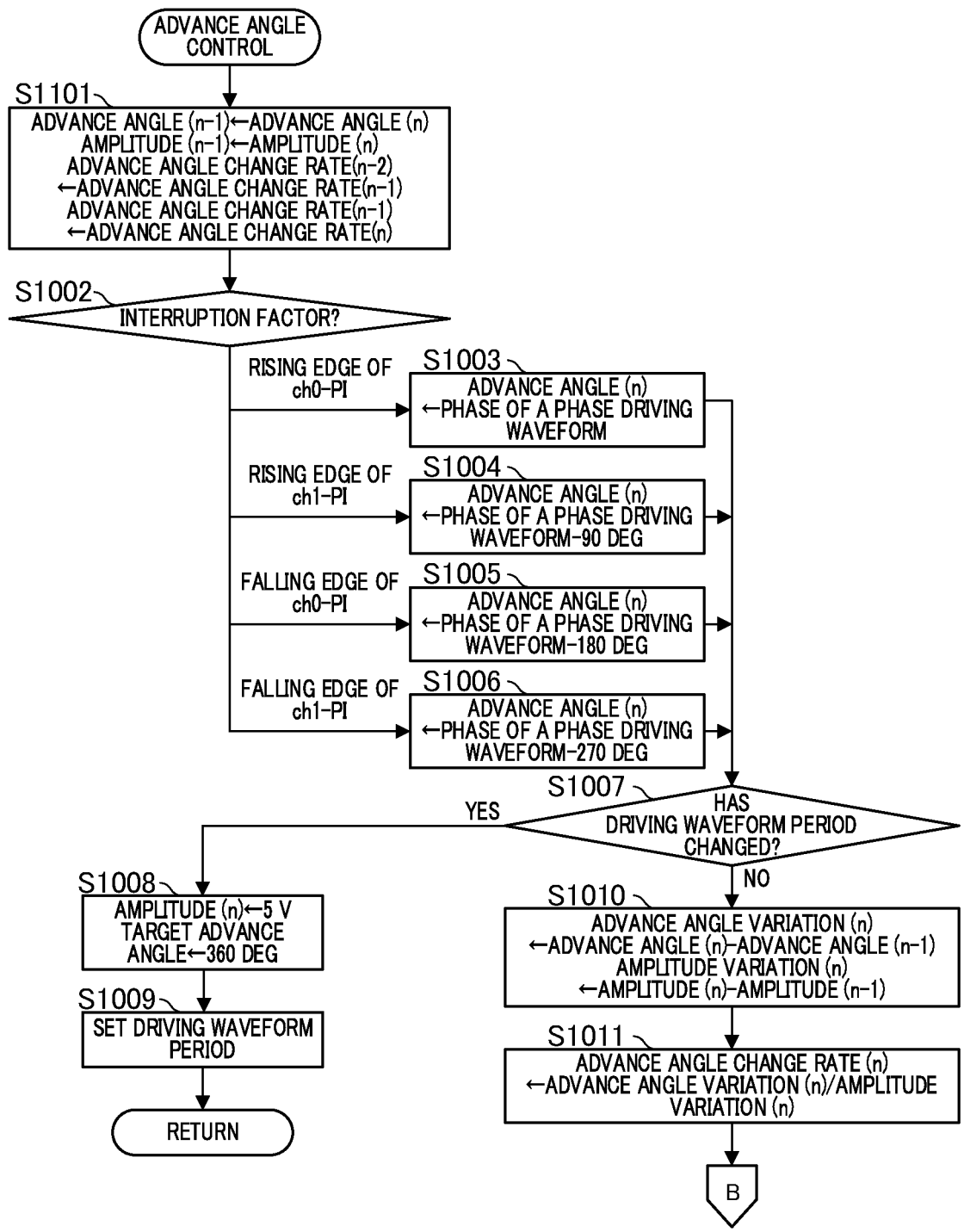
FIG. 12 is a flowchart showing processing performed by an advance angle control unit according to a second embodiment.
Figure 13:
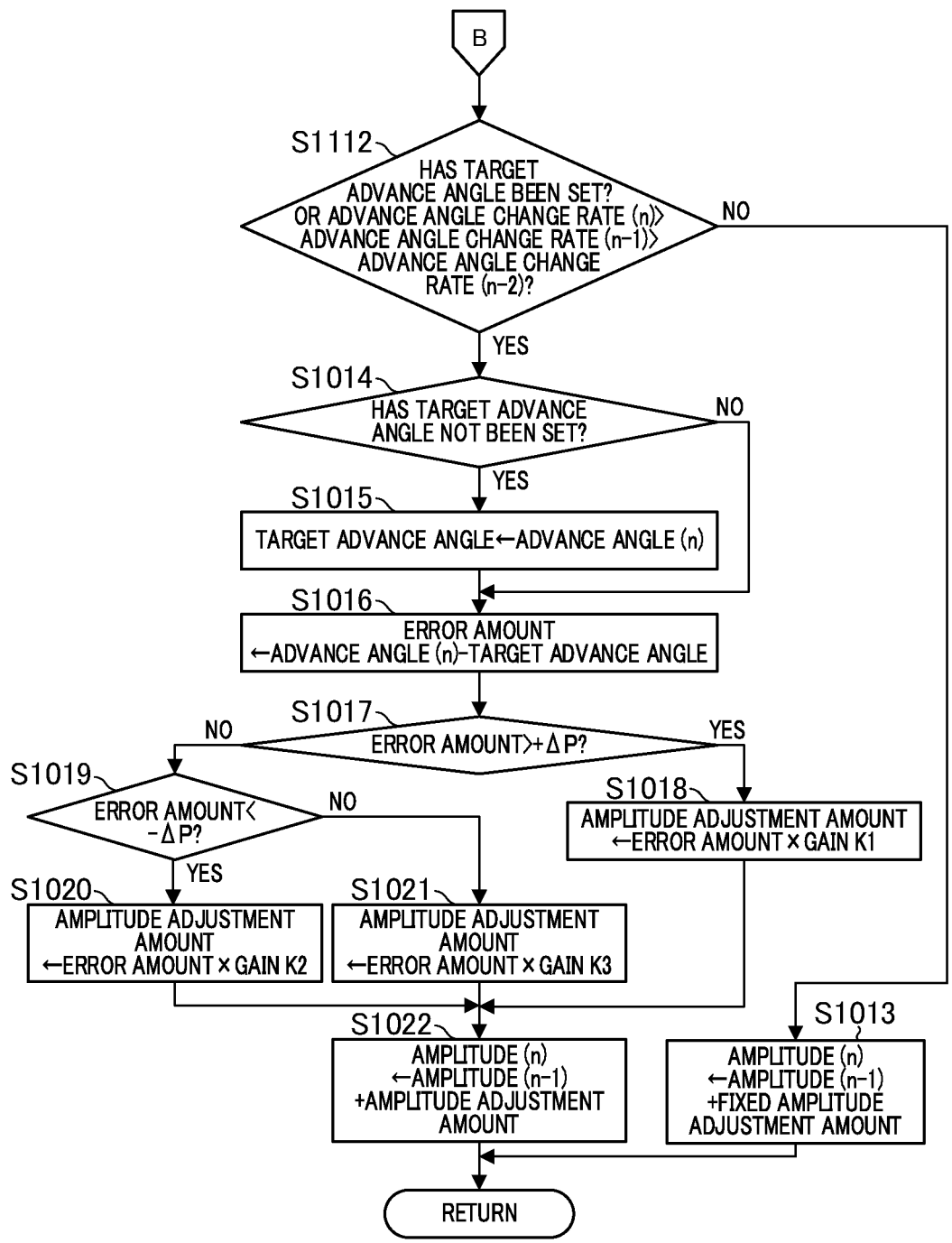
FIG. 13 is a flowchart showing processing subsequent to FIG. 12.

In S1101 of FIG. 12, "processing for backing advance angle change rates calculated in the previous processing and the processing before the previous processing up to an advance angle change rate (n−1) and an advance angle change rate (n−2)" is added to the process of S1001. In addition, after the process of S1011 in FIG. 12 is performed, the process of S1112 in FIG. 13 is changed to processing for determining whether or not a target advance angle has been set or whether or not a relationship of "advance angle change rate (n)>advance angle change rate (n−1)>advance angle change rate (n−2)" is established. In a case where it is determined in S1112 that a target advance angle has been set or an advance angle change rate has changed in a direction in which the advance angle change rate continuously increases twice, the processing proceeds to the process of S1014. Further, in a case where a determination condition of S1112 is not satisfied, the processing proceeds to the process of S1013.

In the present embodiment, processing for determining whether or not an advance angle change rate has changed in a direction in which the advance angle change rate continuously increases twice has been described, but the number of times of continuous increase can be appropriately changed in accordance with the degree of reliability of determination. The number may be set to one change in a direction of increase (advance angle change rate (n)>advance angle change rate (n−1)) in a case where the reliability of determination is high, and the number of times of determination may be further increased in a case where the reliability of determination is low.

According to the present embodiment, advance angle control is performed by continuously determining an advance angle change rate to search for an optimal advance angle, and thus it is possible to obtain a more efficient driving torque.

Third Embodiment

Figure 14:
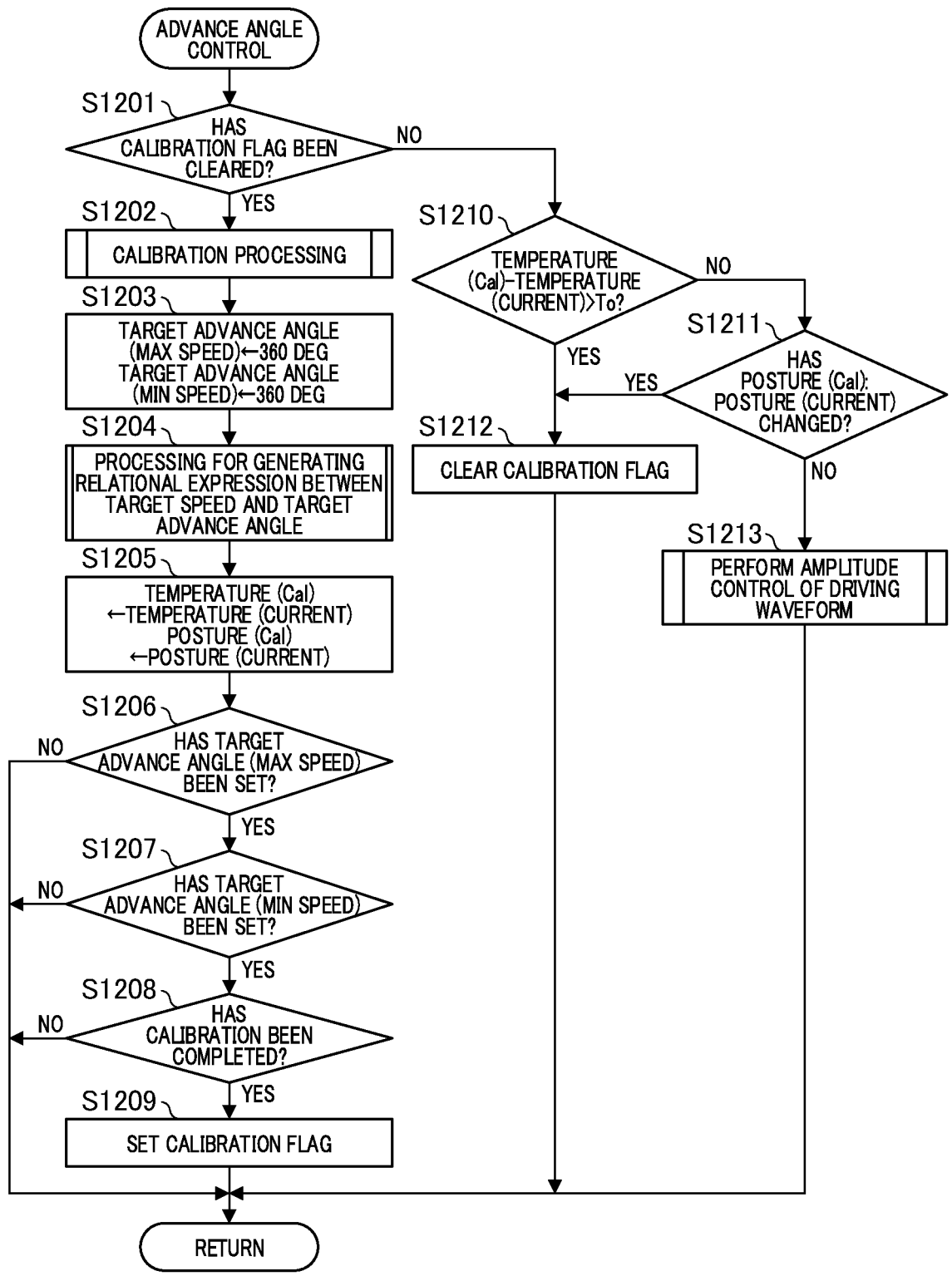
FIG. 14 is a flowchart showing processing performed by an advance angle control unit according to a third embodiment.
Figure 15:
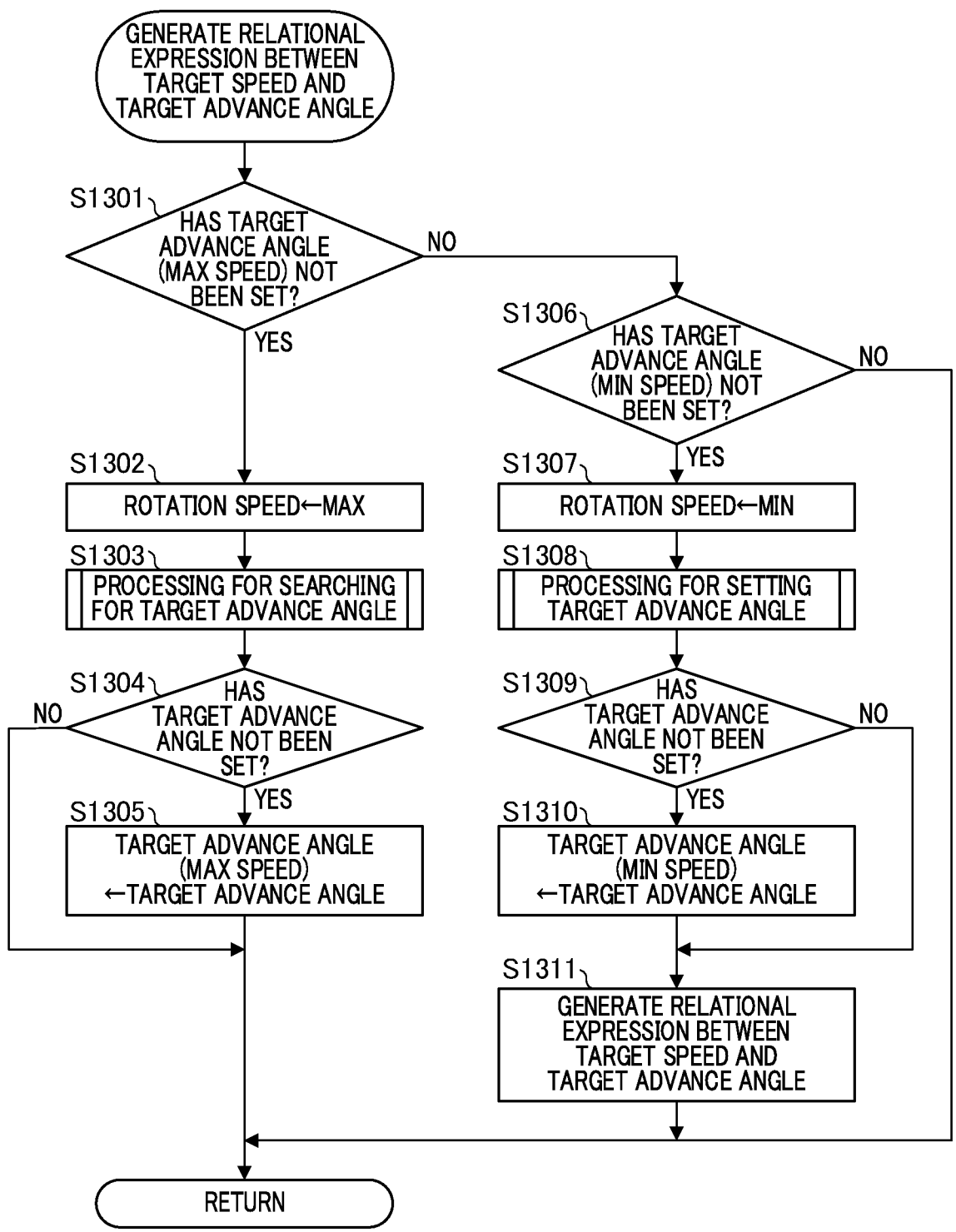
FIG. 15 is a flowchart showing processing for generating a relational expression between a target speed and a target advance angle in the third embodiment.
Figure 16:
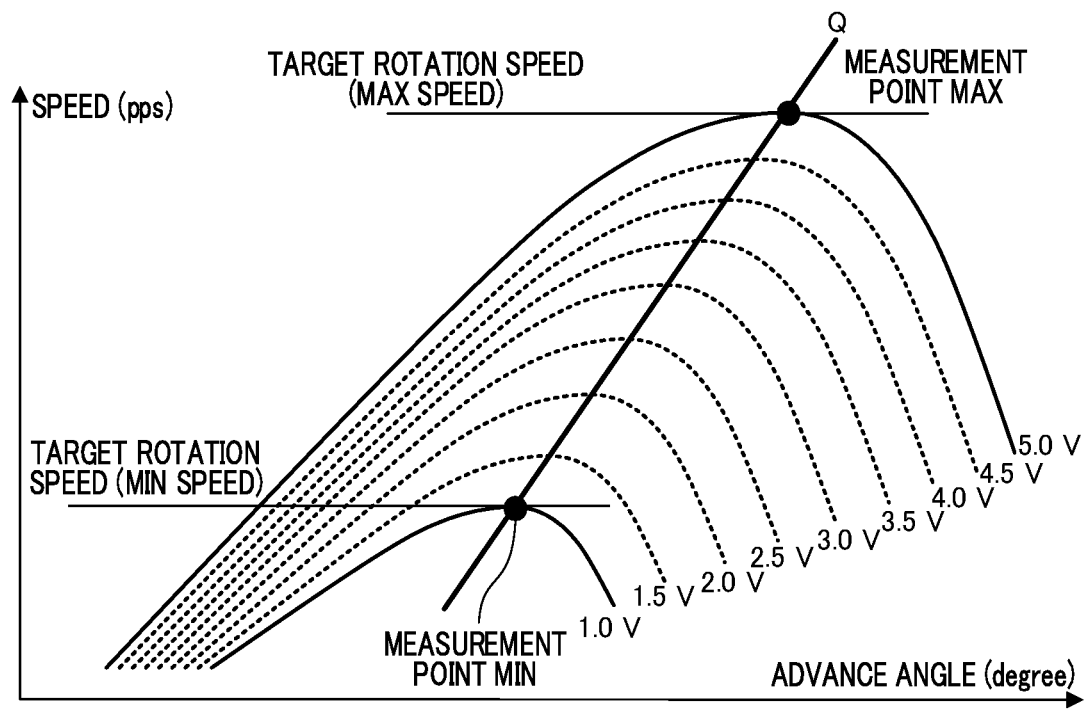
FIG. 16 is a diagram showing a relationship between a target speed and a target advance angle in the third embodiment.
Figure 17:
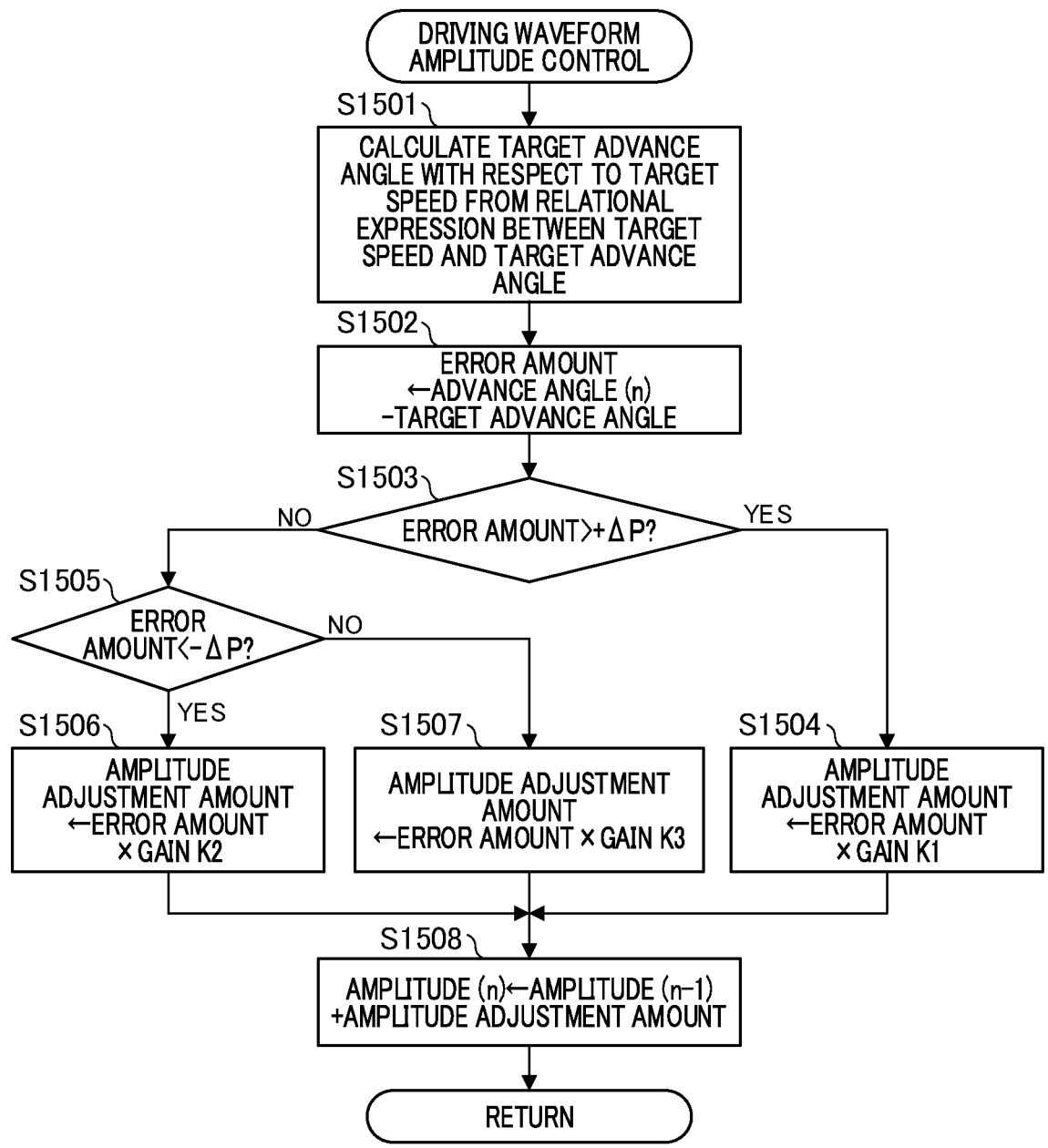
FIG. 17 is a flowchart showing amplitude control in the third embodiment.

In the present embodiment, a method of setting a target advance angle for a target speed during a calibration operation of setting a reference position of a moving member will be described. FIGS. 14, 15, and 17 are flowcharts showing processing performed by the advance angle control unit 204 of the present embodiment. FIG. 16 is a diagram showing a relational expression between a target speed and a target advance angle.

In S1201 of FIG. 14, the advance angle control unit 204 determines whether or not a calibration flag has been cleared. Calibration processing is processing for searching for a reference position of moving coordinates in order to detect an absolute position of a moving member connected to the rotation axis 102 of the stepping motor through the rack 103. Operations of calibration are known well, and thus description thereof will be omitted. A calibration flag is a flag indicating a state where calibration has been completed. In a case where it is determined that a calibration flag has been cleared, the processing proceeds to calibration processing of S1202. In a case where it is determined that the calibration flag has been set, the processing proceeds to the process of S1210. When a power supply is turned on, the calibration flag has been cleared, and the processing necessarily proceeds from S1201 to S1202, so that calibration processing is executed.

In S1203, the advance angle control unit 204 sets 360 degrees for each of a target advance angle (MAX speed) and a target advance angle (MIN speed). The target advance angle (MAX speed) represents a target advance angle at a maximum speed, and the target advance angle (MIN speed) represents a target advance angle at a minimum speed. Here, 360 degrees means that a target advance angle has not yet been set. In S1204, the advance angle control unit 204 performs processing for searching for a target advance angle (MAX speed) and a target advance angle (MIN speed). Processing for generating a relational expression between a target speed and a target advance angle on the basis of a searching result is executed. Details thereof will be described later.

Subsequently, in S1205, the advance angle control unit 204 sets a temperature (Cal) during calibration and a posture (Cal) during calibration. The temperature (Cal) is set on the basis of a temperature (current) detected by a thermistor or the like at the present point in time, and the posture (Cal) is set on the basis of a posture (current) of a device detected by a posture detection sensor or the like at the present point in time.

As described above, the processing for generating a relational expression between a target speed and a target advance angle in S1204 is performed while a searching operation is performed during calibration. In S1206, it is determined whether or not a target advance angle (MAX speed) has been set. In a case where it is determined that a target advance angle (MAX speed) has been set, the processing proceeds to S1207. In a case where a target advance angle has not been set, the processing proceeds to return processing. In S1207, it is determined whether or not a target advance angle (MIN speed) has been set. In a case where it is determined that a target advance angle (MIN speed) has been set, the processing proceeds to S1208. In a case where a target advance angle has not been set, the processing proceeds to return processing.

In S1208, it is determined whether or not calibration has been completed. In a case where it is determined that calibration has been completed, the processing proceeds to S1209. In a case where it is determined that calibration has not been completed, the processing proceeds to return processing, and the calibration is continuously performed.

In S1209, the advance angle control unit 204 sets a calibration flag and completes a series of calibration operations, and the processing proceeds to return processing. After the calibration flag is set, the processing proceeds to the processes of S1201 to S1210.

Here, a relationship between an advance angle and a speed is described. Characteristics of a stepping motor change due to temperature, and thus a relationship between an advance angle and a speed changes. In addition, although grease is applied to a contact portion between the rotation axis 102 and the rack 103, characteristics of the grease also change due to temperature, and thus a relationship between an advance angle and a speed changes. In addition, a fluctuation in load also occurs in the rotation axis 102, the rack 103, or the moving member itself during movement due to thermal expansion or the like, and thus a further change is made to a relationship between an advance angle and a speed. Further, in a case where a posture of a device changes, the load of sliding of a connection portion changes due to a change in the way of application of the weight of the moving member at a contact portion between the rotation axis 102 and the rack 103, and thus a relationship between an advance angle and a speed also changes.

In a relationship between an advance angle and a speed, there is an individual difference between the motor and a moving member connected thereto, and the state of a load changes due to changes with time, a change in temperature, or a difference in posture. For this reason, it is not possible to obtain a control state at an optimal target advance angle at all times only with a relationship between an advance angle and a rotational speed obtained experimentally. Consequently, in the present embodiment, a target advance angle is updated during a calibration operation when a power supply is turned on, so that it is possible to realize a control state at an optimal target advance angle at all times with respect to changes with time. In addition, even when a load fluctuates due to a change in temperature or a difference in posture, it is possible to realize a control state at an optimal target advance angle by updating a target advance angle.

In S1210 of FIG. 14, the advance angle control unit 204 compares a temperature difference obtained by subtracting a temperature (current) detected by a thermistor or the like from a temperature (Cal) of a device during the previous calibration with a threshold value (referred to as To) of a change in temperature. The temperature (Cal) of the device changes depending on a heat source of the surrounding environment, temperature, or the like. The threshold value To is set as a temperature at which optimal advance angle control cannot be performed due to a change in a relationship between an advance angle and a speed. In a case where a temperature difference is greater than the threshold value To, the processing proceeds to the process of S1212. In a case where the temperature difference is equal to or less than the threshold value, the processing proceeds to the process of S1211.

In S1211, the advance angle control unit 204 determines whether or not a posture (current) detected by a posture detection sensor or the like has changed with respect to the posture (Cal) of the device during the previous calibration. For example, in an example of application to an imaging device, it is possible to detect a change in a state where a user grasps the device, body shaking, and the like by a posture detection sensor (a gyro sensor, an acceleration sensor, or the like). In a case where a change in the posture (current) of the device has been detected, the processing proceeds to the process of S1212. In a case where a change in posture (current) is within a predetermined allowable range, the processing proceeds to the process of S1213.

In S1212, a calibration flag is cleared. In this case, the processes of S1202 to S1205 are performed again, and a target advance angle is updated. Further, in a case where calibration has been completed, amplitude control of a driving waveform is performed in S1213. After the processes of S1212 and S1213 are performed, the processing proceeds to return processing.

Next, processing for updating a target advance angle to generate a relational expression between a target speed and the target advance angle (FIG. 14: S1204) will be described with reference to FIG. 15. First, in S1301, the advance angle control unit 204 determines whether or not a target advance angle searched for at a maximum speed that can be set in accordance with a target speed of the moving member has been set. This target advance angle is set to be a target advance angle (MAX speed). In a case where the target advance angle (MAX speed) has not yet been set, the processing proceeds to the process of S1302. In a case where the target advance angle (MAX speed) has been set, the processing proceeds to the process of S1306.

The advance angle control unit 204 sets a target rotation speed to be a maximum speed in S1302 and executes processing for searching for a target advance angle in S1303. The processing for searching for a target advance angle is the processes of S1001 to S1022 described in FIGS. 10 and 11 in the first embodiment. Alternatively, the processing for searching for a target advance angle is the processes of S1101, S1002 to S1011, S1112, and S1013 to S1022 described in FIGS. 12 an 13 in the second embodiment. The processing has been already described, and thus description of searching processing will be omitted.

In S1304 of FIG. 15, the advance angle control unit 204 determines whether or not the searching of a target advance angle has been completed and a target advance angle has been set. In a case where a target advance angle has not yet been set, the processing proceeds to the process of S1305. In a case where a target advance angle has been set, the processing proceeds to return processing. In S1305, the advance angle control unit 204 sets the searched target advance angle as a target advance angle (MAX speed) and then proceeds to return processing.

In the next process after the target advance angle (MAX speed) is set, the processing proceeds to the processes of S1301 to S1306. In S1306, the advance angle control unit 204 determines whether or not a target advance angle searched for at a minimum speed that can be set in accordance with a target speed of the moving member has been set. This target advance angle is set to be a target advance angle (MIN speed). In a case where the target advance angle (MIN speed) has not been set, the processing proceeds to the process of S1307. In a case where the target advance angle (MIN speed) has been set, the processing proceeds to return processing.

The advance angle control unit 204 sets a target rotation speed to be a minimum speed in S1307 and executes processing for searching for a target advance angle in S1308. The searching processing is the same as the process of S1303. In S1309, the advance angle control unit 204 determines whether or not the searching of a target advance angle has been completed and a target advance angle has been set. In a case where a target advance angle has not yet been set, the processing proceeds to the process of S1310. In a case where a target advance angle has been set, the processing proceeds to the process of S1311.

In S1310, the advance angle control unit 204 sets the searched target advance angle as a target advance angle (MIN speed). In S1311, the advance angle control unit 204 generates a relational expression between a target speed and a target advance angle from the searched target speed (MAX speed) and target speed (MIN speed). A relational expression between a target speed and a target advance angle will be specifically described with reference to FIG. 16.

FIG. 16 is a diagram showing a relationship between an advance angle (unit: degrees) of a driving waveform with respect to a rotational phase of a rotor and a drivable rotation speed (unit: pulses per second) when a horizontal axis represents the advance angle and a vertical axis represents the drivable rotation speed. Amplitudes of a driving waveform output from the motor driver unit 206 are shown in increments of 0.5 V in a range of 1.0 V to 5.0 V. Here, a "measurement point MAX" represents a measurement point corresponding to a MAX speed which is a maximum value of a target rotation speed and is positioned at a saturation point on a graph curve of a maximum amplitude of 5.0 V. In addition, a "measurement point MIN" represents a measurement point corresponding to a MIN speed which is a minimum value of a target rotation speed and is positioned at a saturation point on a graph curve of a minimum amplitude of 1.0 V.

In the process of S1303 shown in FIG. 15, searching is performed toward the "measurement point MAX" which is a saturation point of an advance angle-speed characteristic in FIG. 16. Further, in the process of S1308 shown in FIG. 15, searching is performed toward the "measurement point MIN" which is a saturation point of an advance angle-speed characteristic in FIG. 16. A straight line Q is a straight line connecting the "measurement point MAX" searched for in S1303 and the "measurement point MIN" searched for in S1308. That is, a straight line Q is drawn following a point which is substantially consistent with a saturation point of an advance angle-speed characteristic in an amplitude of a driving waveform which is present between these measurement points. From this relationship, it can be understood that a target advance angle for obtaining maximum efficiency with respect to a target rotation speed is obtained by a relational expression of the straight line Q.

The relational expression of the straight line Q is represented by the following (Expression 2) linear expression. Here, a is a constant representing an inclination of the straight line Q, and b is a constant representing an intercept of the straight line Q.

Target speed=$a$×target advance angle+$b$ $a$=(target speed (MAX speed)−target speed (MIN speed))/(target advance angle (MAX speed)−target advance angle (MIN speed))

$b$=target speed (MAX speed)−$a$×target advance angle (MAX speed)     (Expression 2)

In S1311 of FIG. 15, a relational expression between a target speed and a target advance angle is generated using (Expression 2).

Next, driving waveform amplitude control processing of S1213 shown in FIG. 14 will be described with reference to a flowchart of FIG. 17. First, in S1501, the advance angle control unit 204 acquires a target speed from period information generated by the driving waveform period generation unit 203. The advance angle control unit 204 calculates a target advance angle with respect to a target speed from a relational expression between a target speed and a target advance angle which is generated on the basis of (Expression 2) in S1311 of FIG. 15.

In S1502, the advance angle control unit 204 calculates an error amount. A deviation amount of an advance angle (n) detected for a target advance angle, that is, an amount obtained by subtracting the target advance angle from the advance angle (n) is an error amount. Next, in S1503, the advance angle control unit 204 determines whether or not the calculated error amount has exceeded +ΔP (see FIG. 9B). In a case where it is determined that the error amount has exceeded +ΔP (see the region P1 in FIG. 9B), the processing proceeds to the process of S1504. In a case where it is determined that the error amount is equal to or less than +ΔP, the processing proceeds to the process of S1505.

In S1504, the advance angle control unit 204 multiplies an error amount by a gain to calculate an amplitude adjustment amount. In this case, control has to be performed so that a rotation speed does not exceed a saturation point (M) by rapidly increasing an amplitude. Consequently, a large gain K1 is selected, and a large amplitude adjustment amount obtained by multiplying an error amount by the gain K1 is calculated.

In S1505, the advance angle control unit 204 determines whether or not the calculated error amount is less than −ΔP (see FIG. 9B). In a case where it is determined that the error amount is less than −ΔP (see the region P2 in FIG. 9B), the processing proceeds to the process of S1506. In a case where it is determined that the error amount is equal to or greater than −ΔP, the processing proceeds to the process of S1507.

In S1506, the advance angle control unit 204 multiplies an error amount by a gain to calculate an amplitude adjustment amount. In this case, since retraction to a target advance angle is being performed, a gain K2 larger than the gain K1 is selected in order to rapidly reduce an amplitude for the purpose of increasing the speed of retraction, and a large amplitude adjustment amount obtained by multiplying an error amount by the gain K2 is calculated. That is, in FIG. 9B, in the region P2 in which the error amount is less than −ΔP, an advance angle variation with respect to an amplitude variation becomes smaller than that in the region P1 in which the error amount exceeds +ΔP, and thus a larger gain satisfying K2>K1 is set.

In S1507, the advance angle control unit 204 multiplies an error amount by a gain to calculate an amplitude adjustment amount. In this case, the error amount is equal to or greater than −ΔP (see the region P3 in FIG. 9B), and the retraction to a target advance angle has been completed. Accordingly, a gain K3 smaller than the gain K1 is selected as a gain for amplitude adjustment in order to perform control so that an advance angle is set to be in a stable state in the vicinity of a target advance angle, and a small amplitude adjustment amount obtained by multiplying an error amount by the gain K3 is calculated.

After the processes of S1504, S1506, and S1507 are performed, the advance angle control unit 204 performs correction corresponding to a set amplitude adjustment amount to calculate an "amplitude (n)" of a driving waveform in S1508. That is, the current "amplitude (n)" is calculated by adding an amplitude adjustment amount to the previous "amplitude (n−1)". The advance angle control unit 204 outputs period information designated by the driving waveform period generation unit 203 and amplitude information of a driving waveform which is set this time to the driving waveform generation unit 205 to control the driving waveform.

In the present embodiment, even when a load varies due to an individual difference (variation) between a motor and a moving member, changes with time, a change in temperature, a difference in posture, or the like, control is performed by searching for an optimal advance angle, and thus it is possible to obtain an efficient driving torque at all times. Further, in the present embodiment, the searching of a target advance angle and the setting of a relational expression between a speed and an advance angle are performed during calibration. Accordingly, an operation of searching for a target advance angle which is performed when a target speed is changed is not required, and thus it is possible to more rapidly perform control at an optimal advance angle.

Fourth Embodiment

Figure 18A:
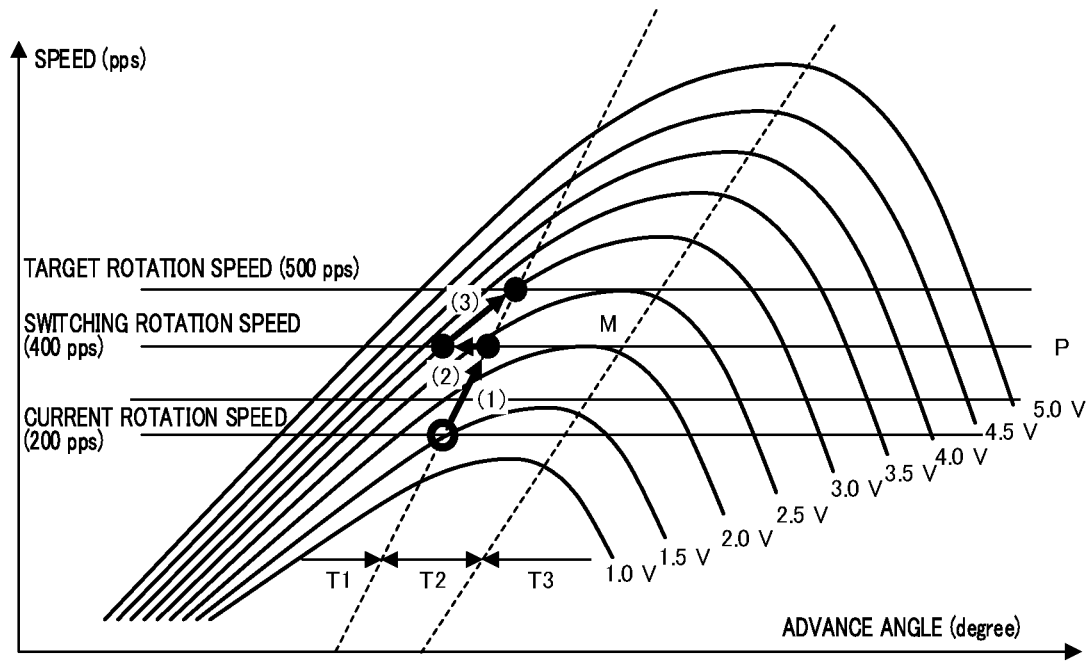
FIGS. 18A and 18B are diagrams showing a relationship between an amplitude of a driving waveform, an advance angle, and a rotation speed in switching of a control method.
Figure 18B:
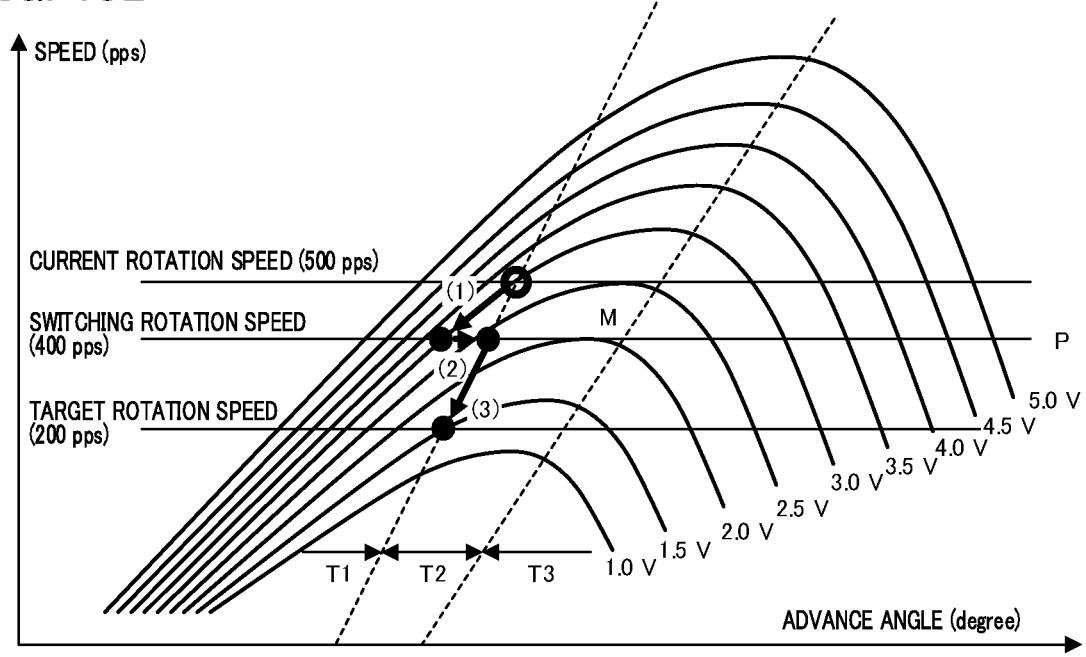

In the present embodiment, a method of selecting a period control method and an amplitude control method will be described. FIGS. 18A and 18B are diagrams showing a process of switching between a period control method and an amplitude control method in accordance with a target rotation speed of a motor. The setting of a horizontal axis and a vertical axis in FIGS. 18A and 18B is the same as that in FIG. 9, and amplitudes of driving waveforms output from the motor driver unit 206 shown in each graph in increments of 0.5 V in a range of 1.0 V to 5.0 V. In the present embodiment, a rotation speed which is a threshold value of switching of a control method is defined as 400 pps, a period control method is used when a rotation speed is greater than 400 pps, and an amplitude control method is used when a rotation speed is equal to or less than 400 pps.

FIG. 18A shows a relationship between a driving amplitude, a speed, and an advance angle when a target rotation speed is increased from 200 pps to 500 pps. When the advance angle control unit 204 gradually increases a target rotation speed, the advance angle control unit performs amplitude control in a case where the rotation speed is equal to or less than 400 pps, and changes a voltage in accordance with a target advance angle at which maximum efficiency is obtained. The advance angle control unit 204 increases a rotation speed while performing amplitude control as indicated by an arrow (1) from the current point corresponding to 200 pps on a graph of 1.5 V.

In a case where a value greater than 400 pps is set to be a target rotation speed, the advance angle control unit 204 first increases a driving amplitude to 3.0 V at a rotation speed of 400 pps as indicated by an arrow (2) on a line P. In a case where switching to a period control method is immediately performed after control indicated by the arrow (1) is performed without performing this processing, an amplitude is fixed at approximately 2.5 V corresponding to an end position of the arrow (1), and thus a required torque is not obtained.

Thereafter, the advance angle control unit 204 controls an advance angle amount in a state where an amplitude is fixed to 3.0 V as indicated by an arrow (3) to make the advance angle amount reach 500 pps which is a target rotation speed. Here, period control will be supplementarily described. As described above, a region T1 is a region in which an advance angle and a rotation speed have a linear relationship. Therefore, a relational expression between an advance angle and a rotation speed is set in advance, so that a rotation speed can be controlled by adjusting an advance angle. Control of changing an advance angle amount and increasing a speed is performed in a region indicated by the arrow (3), that is, a region in which the control of a period control method is performed.

On the other hand, deceleration control will be described with reference to FIG. 18B. The current rotation speed is set to 500 pps, a switching rotation speed is set to 400 pps, and a target rotation speed is set to 200 pps. As indicated by the arrow (1), a region in which a rotation speed is between 500 pps and 400 pps is a region for a period control method, similar to the case indicated by the arrow (3) shown in FIG. 18A. That is, the advance angle control unit 204 performs control of changing an advance angle amount to reduce a speed.

When a rotation speed reaches 400 pps, the advance angle control unit 204 performs switching to an amplitude control method in a region indicated by the arrow (2) on the line P and performs control of reducing a voltage to an amplitude in which maximum efficiency is obtained. After a voltage is reduced to an amplitude in which maximum efficiency is obtained, the advance angle control unit 204 reduces a speed to 200 pps so as to maintain maximum efficiency as indicated by the arrow (3).

As described above, a period control method for obtaining a high torque is used in a high speed region in order to give priority to responsiveness in a high speed region, and an amplitude control method capable of performing control with an efficient voltage while maintaining quietness is used in a low speed region. Here, it is assumed that period control is also used in a low speed region even at a rotation speed of 400 pps or less in a driving mode in which responsiveness is required. Control performed in this case will be described using FIGS. 19A and 19B. The setting of a horizontal axis and a vertical axis, and the like in FIGS. 19A and 19B are the same as those in FIGS. 18A and 18B.

Figure 19A:
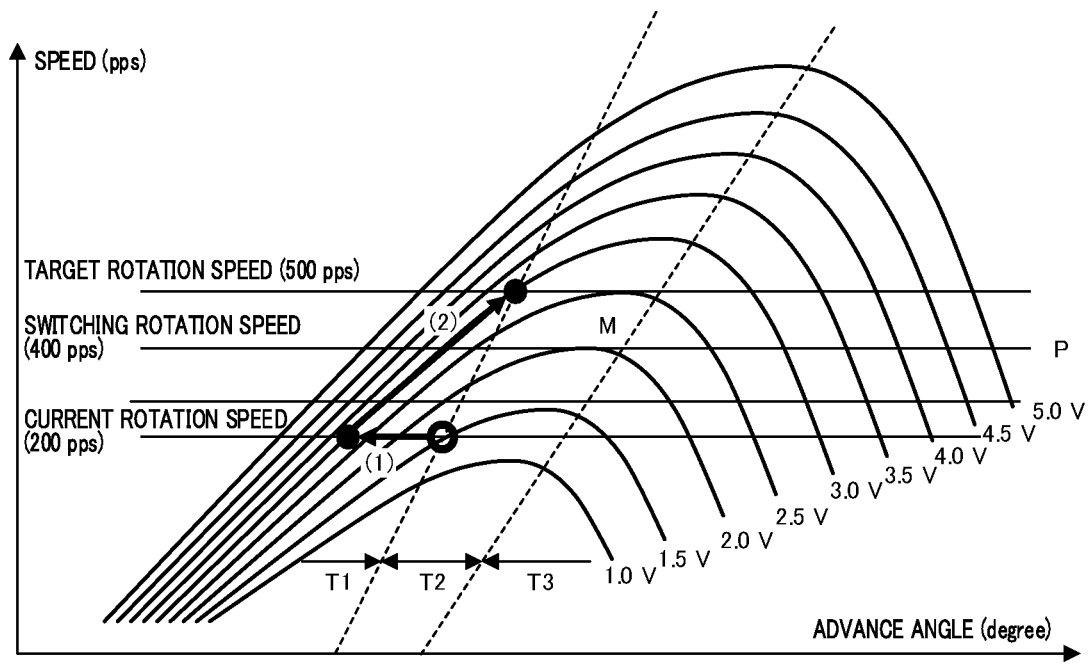
FIGS. 19A and 19B are diagrams showing another example of a relationship between an amplitude of a driving waveform, an advance angle, and a rotation speed in switching of a control method.
Figure 19B:
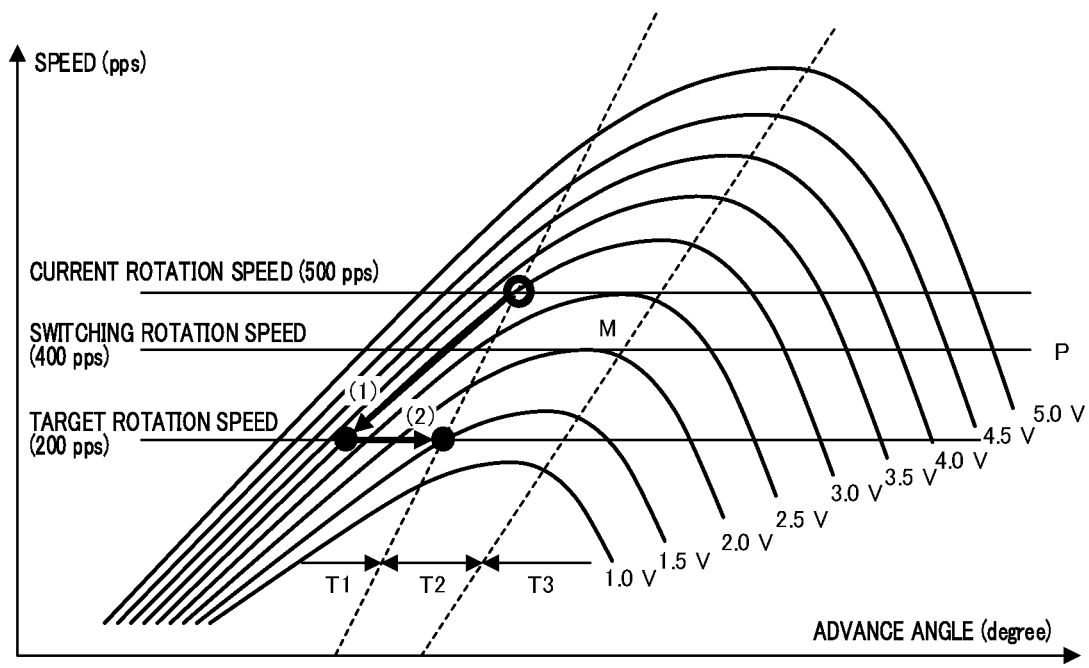

FIG. 19A is a diagram showing processing for increasing a rotation speed from the current rotation speed of 200 pps to a target rotation speed of 500 pps using a period control method. The advance angle control unit 204 increases an amplitude to 3.0 V required for period control at a point in time when a rotation speed is 200 pps as indicated by an arrow (1). Thereafter, the advance angle control unit 204 changes an advance angle amount similar to the case indicated by the arrow (3) shown in FIG. 18A to make a rotation speed reach a target rotation speed of 500 pps as indicated by an arrow (2) shown in FIG. 19A.

On the other hand, a case where a speed is reduced in deceleration processing will be described in FIG. 19B. First, the advance angle control unit 204 changes an advance angle amount as indicated by an arrow (1) while setting a driving amplitude to 3.0 V using a period control method to make a rotation speed reach 200 pps. After a rotation speed is reduced, the advance angle control unit 204 reduces a driving amplitude to a value of maximum efficiency using an amplitude control method as indicated by an arrow (2).

In the present embodiment, an example in which a switching rotation speed is set to 400 pps has been described, but a numerical value set as a switching rotation speed is not limited thereto. An example of a method of determining a numerical value of a switching rotation speed includes a method of previously predicting a rotation speed at which quietness of a motor is maintained and setting a point corresponding to the rotation speed to be a switching point for a control method. Here, the switching rotation speed may be determined on the basis of a factor (for example, power consumption) other than quietness, and a method thereof is not limited.

Figure 20:
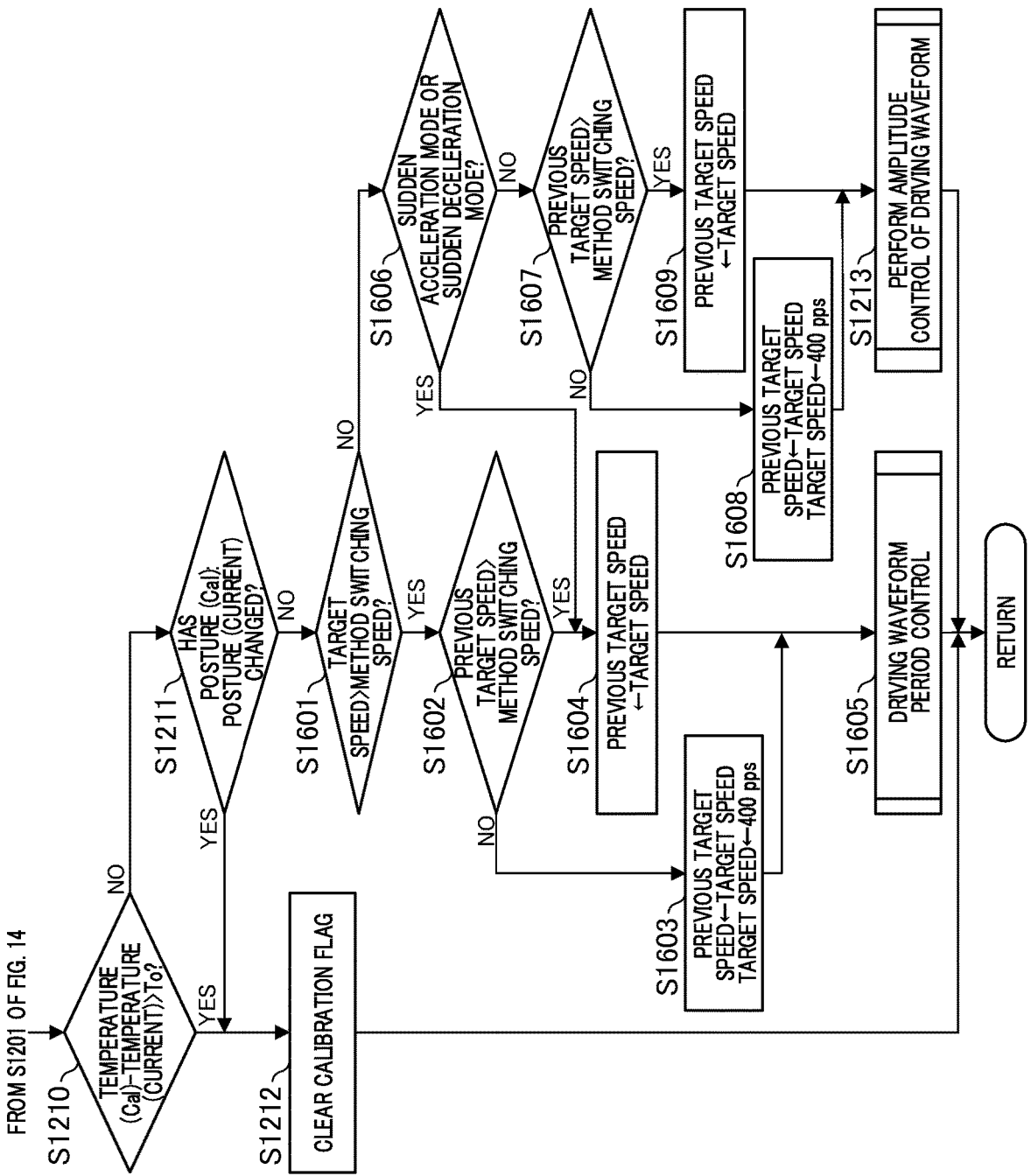
FIG. 20 is a flowchart showing processing performed by an advance angle control unit according to a fourth embodiment.

Processing for switching a control method will be described with reference to flowcharts of FIGS. 14 and 20. Here, the processing of FIG. 14 (step numbers of 1201 to 1213) has been described, and thus processes added in the present embodiment (processes that are given step numbers larger than 1600) will be described.

In a case where the processing proceeds from S1211 to S1601 (in a case where a change in posture is in an allowable range), the advance angle control unit 204 determines whether or not a target rotation speed is higher than a switching rotation speed of 400 pps in S1601. In a case where it is determined that the target rotation speed is higher than the switching rotation speed of 400 pps, the processing proceeds to S1602. In a case where it is determined that the target rotation speed is equal to or less than 400 pps, the processing proceeds to S1606.

In S1602, the advance angle control unit 204 determines whether or not the previous target rotation speed is higher than the switching rotation speed of 400 pps. In a case where it is determined that the previous target rotation speed is higher than 400 pps, the processing proceeds to S1604. In a case where it is determined that the previous target rotation speed is equal to or less than 400 pps, the processing proceeds to S1603.

In S1604, the advance angle control unit 204 updates a value stored as the previous target rotation speed at the current target rotation speed, and makes the processing proceed to period control for a driving waveform in S1605. The period control in S1605 will be described using FIG. 21. Further, in S1603, the advance angle control unit 204 updates a value stored as the previous target rotation speed at the current target rotation speed. Thereafter, the advance angle control unit 204 temporarily sets a target rotation speed to 400 pps and then makes the processing proceed to period control processing of S1605. This corresponds to the processing contents indicated by the arrow (2) shown in FIG. 18A. After the period control for a driving waveform shown in S1605 is performed, the processing proceeds to return processing.

In S1606, the advance angle control unit 204 determines whether it is a sudden acceleration mode or a sudden deceleration mode. The sudden acceleration mode or the sudden deceleration mode is a control mode aimed at making a speed more rapidly reach a target speed than quietness or the like, and control of acceleration or deceleration which is larger than a threshold value is performed. In the case of a sudden acceleration mode or a sudden deceleration mode, the processing proceeds to the process of S1604, and the period control in S1605 is selected. This corresponds to the processing contents shown in FIG. 19.

In a case where it is neither a sudden acceleration mode nor a sudden deceleration mode in S1606, the processing proceeds to the process of S1607. In S1607, the advance angle control unit 204 determines whether or not the previous target rotation speed is higher than 400 pps. In a case where it is determined that the previous target rotation speed is equal to or less than 400 pps, amplitude control from the previous time is continued, and the advance angle control unit 204 updates a value stored as the previous target rotation speed at the current target rotation speed in S1608. Thereafter, the advance angle control unit 204 temporarily sets a target rotation speed to 400 pps and then makes the processing proceed to amplitude control processing shown in S1213. This corresponds to the processing contents indicated by the arrow (2) shown in FIG. 18B.

On the other hand, in the determination processing of S1607, in a case where it is determined that the previous target rotation speed is higher than 400 pps, the processing proceeds to the process of S1609. The advance angle control unit 204 updates a value stored as the previous target rotation speed at the current target rotation speed in S1609 and then proceeds to the amplitude control processing of S1213. In addition, since the determination processing of S1607 is the same processing as S1602, a determination result in S1602 is stored, and the processing may be performed in S1607 using the stored result.

Figure 21:
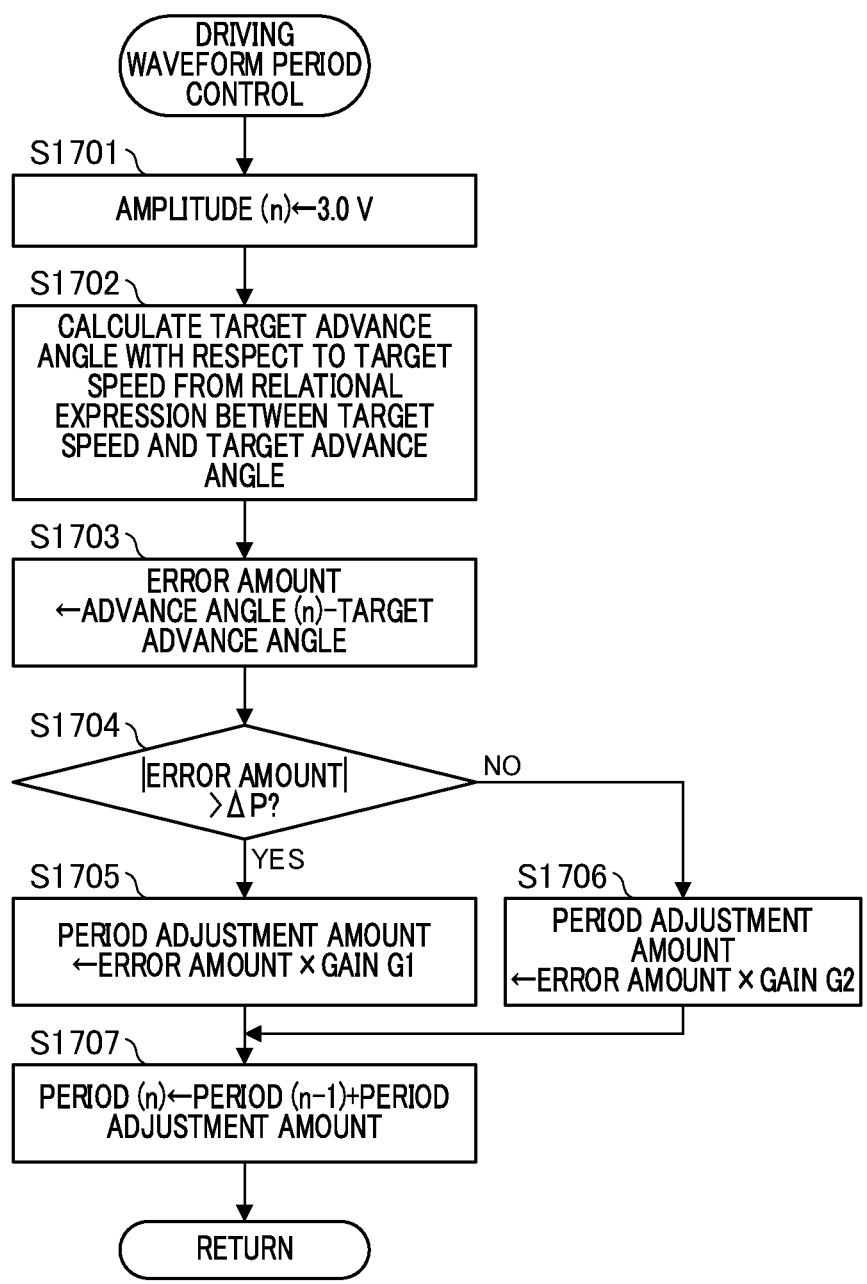
FIG. 21 is a flowchart showing processing for controlling a period of a driving waveform in the fourth embodiment.

The period control processing for a driving waveform shown in S1605 of FIG. 20 will be described with reference to FIG. 21. In period control, the advance angle control unit 204 fixes an amplitude (n) to 3.0 V in S1701. In S1702, the advance angle control unit 204 calculates an advance angle corresponding to the current target rotation speed as a target advance angle. As described above, a region T1 in FIG. 19 is a linear region in which a relationship between an advance angle and a speed is a linear relationship, and it is possible to set a target advance angle in S1702 by setting a relational expression between an advance angle and a rotation speed in advance.

In S1703, the advance angle control unit 204 calculates a deviation amount of a detected advance angle (n) with respect to a target advance angle as an error amount. Subsequently, in S1704, the advance angle control unit 204 determines whether or not the value of the calculated error amount (absolute value) exceeds ΔP. The calculation of a control amount with respect to an error amount is the same as in the case of an amplitude control method. Here, ΔP has been described in FIG. 9 of the first embodiment. In a case where it is determined that the absolute value of the error amount is greater than ΔP, the processing proceeds to S1705. In a case where it is determined that the absolute value of the error amount is equal to or less than ΔP, the processing proceeds to S1706.

In S1705, the advance angle control unit 204 selects a large gain G1 as a gain of a period adjustment amount and calculates a large period adjustment amount obtained by multiplying an error amount by the gain G1. Thereby, a period adjustment amount for increasing the speed of retraction to a target advance angle is calculated.

In a case where the processing proceeds from S1704 to S1706, retraction to a target advance angle has been completed, and thus the advance angle control unit 204 performs control for setting an advance angle to be in a stable state in the vicinity of the target advance angle. In S1706, the advance angle control unit 204 selects a gain G2 smaller than G1 as a gain of a period adjustment amount and calculates a small period adjustment amount obtained by multiplying an error amount by the gain G2.

After the processes of S1705 and S1706 are performed, the advance angle control unit 204 performs correction by adding the set period adjustment amount to a "period (n−1)" of a driving waveform to calculates a "period (n)" in S1707. The advance angle control unit 204 outputs information of the "period (n)" and an amplitude of 3.0 V which is previously set to the driving waveform generation unit 205 to control a driving waveform. After the process of S1707 is performed, the processing proceeds to return processing.

According to the present embodiment, in a case where a speed in a high speed region, or an acceleration or deceleration exceeding a threshold value is required as a motor rotation speed, it is possible to rotate a rotor with a high torque up to a target speed and improve responsiveness. Further, in a case where a speed in a low speed region or a gentle acceleration or deceleration is required as a motor rotation speed, it is possible to drive a motor with a more efficient driving voltage while maintaining quietness.

According to the embodiment, an advance angle amount which is optimal at all times is set as a target advance angle even when the state of a control target has changed, so that it is possible to maximize the rotational efficiency of the motor and realize an increase in speed and power saving.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-114652, filed Jun. 20, 2019 which is hereby incorporated by reference wherein in its entirety.

What is claimed is:

1. A motor control device comprising:
   a detection unit which detects a rotational phase of a rotor of a stepping motor;
   a generation unit which generates a driving waveform for driving the stepping motor; and
   a control unit which detects a phase difference between a rotational phase of the rotor and a phase of the driving waveform and controls an amplitude or a period of the driving waveform to control the phase difference,
   wherein the control unit determines a target phase difference from a variation of the phase difference with respect to a variation of the amplitude of the driving waveform to control the amplitude of the driving waveform, and
   wherein at least one processor or circuit is configured to perform a function of at least one of the units.

2. The motor control device according to claim 1, wherein the control unit detects a variation of the phase difference when the amplitude of the driving waveform is changed, and determines the phase difference when a relationship between the variation of the amplitude and the variation of the phase difference satisfies a predetermined condition to be the target phase difference.

3. The motor control device according to claim 1, wherein the control unit sets the target phase difference corresponding to a change in the phase difference when the amplitude of the driving waveform is changed, and performs control of bringing the phase difference close to the target phase difference through amplitude control for the driving waveform after the target phase difference is set.

4. The motor control device according to claim 3, wherein the control unit detects the variation of the phase difference while reducing the amplitude of the driving waveform, and sets the phase difference when a ratio of the variation of the phase difference to the variation of the amplitude of the driving waveform satisfies a predetermined condition as the target phase difference.

5. The motor control device according to claim 4, wherein the control unit sets the target phase difference from the phase difference when the ratio is equal to or greater than a threshold value.

6. The motor control device according to claim 5, wherein the control unit sets the threshold value based on the variation of the phase difference occurring due to a fluctuation in rotation caused by cogging of the stepping motor, a fluctuation in load applied to the stepping motor, or a fluctuation in rotation caused by noise of the driving waveform.

7. The motor control device according to claim 3, wherein the control unit sets, as the target phase difference, the phase difference when a ratio of the variation of the phase difference to the variation of the amplitude of the driving waveform has changed in a direction in which the ratio continuously increases.

8. The motor control device according to claim 1, wherein the variation of the phase difference in a period in which the control unit performs processing changes depending on a variation of the amplitude of the driving waveform which is controlled in the period.

9. The motor control device according to claim 8, wherein the control unit sets an amplitude adjustment amount of the driving waveform to be a first adjustment amount in a case where a value of a difference between the detected phase difference and the set target phase difference is greater than a threshold value, and sets an amplitude adjustment amount of the driving waveform to be a second adjustment amount smaller than the first adjustment amount in a case where the value of the difference is smaller than the threshold value.

10. The motor control device according to claim 1, wherein the control unit
   sets a first condition for setting a rotation speed of the stepping motor to be a first rotation speed and a second condition for setting the rotation speed to be a second rotation speed,
   sets the phase difference in which the variation of the phase difference when the amplitude of the driving waveform has been changed satisfies each of the set first and second conditions to be the target phase difference, and
   generates a relational expression between the rotation speed and the phase difference from a relationship between each of the first and second rotation speeds and the target phase difference corresponding to each of the first and second rotation speeds to calculate the target phase difference corresponding to a target rotation speed of the stepping motor using the relational expression.

11. The motor control device according to claim 10, wherein the control unit generates a linear expression representing a relationship between the rotation speed and the phase difference as the relational expression.

12. The motor control device according to claim 1, wherein the control unit selects first control for controlling the amplitude of the driving waveform or second control for controlling the period of the driving waveform.

13. The motor control device according to claim 12, wherein the control unit selects the second control in a case where a target rotation speed of the stepping motor is greater than a threshold value or in a case where a driving mode for performing acceleration or deceleration exceeding a threshold value is set.

14. The motor control device according to claim 12, wherein in a case where a change from the first control to the second control is performed, the control unit changes the amplitude of the driving waveform to a predetermined amplitude through the second control and calculates the target phase difference to control the period of the driving waveform.

15. The motor control device according to claim 12, wherein in a case where a change from the second control to the first control is performed, the control unit controls the amplitude of the driving waveform in accordance with the target phase difference determined from a variation of the phase difference with respect to a variation of the amplitude of the driving waveform.

16. The motor control device according to claim 12, wherein the control unit selects an amplitude of the driving waveform in a region in which a relationship between the phase difference and a rotation speed of the stepping motor is a linear relationship and changes the period of the driving waveform to control the rotation speed.

17. The motor control device according to claim 12, wherein the control unit sets a period adjustment amount of the driving waveform to be a first adjustment amount through the second control in a case where a value of a difference between the detected phase difference and the set target phase difference is greater than a threshold value, and sets a period adjustment amount of the driving waveform to be a second adjustment amount smaller than the first adjustment amount in a case where the value of the difference is smaller than the threshold value.

18. The motor control device according to claim 1, wherein the control unit sets the target phase difference with respect to a target rotation speed of the stepping motor during calibration for setting a reference position of a moving member moved by the stepping motor.

19. The motor control device according to claim 18, wherein the control unit sets the target phase difference with respect to the target rotation speed of the stepping motor during the next calibration in a case where a difference between a temperature of the device during the previous calibration and a current temperature is greater than a threshold value.

20. The motor control device according to claim 18, wherein the control unit sets the target phase difference with respect to the target rotation speed of the stepping motor during the next calibration in a case where the current posture has changed from the posture of the device during the previous calibration.

21. An optical apparatus comprising:
a motor control device which performs drive control of a stepping motor;
an optical member; and
the stepping motor,
wherein the motor control device comprising:
a detection unit which detects a rotational phase of a rotor of a stepping motor;
a generation unit which generates a driving waveform for driving the stepping motor; and
a control unit which detects a phase difference between a rotational phase of the rotor and a phase of the driving waveform and controls an amplitude or a period of the driving waveform to control the phase difference,
wherein the control unit determines a target phase difference from a variation of the phase difference with respect to a variation of the amplitude of the driving waveform to control the amplitude of the driving waveform, and
wherein at least one processor or circuit is configured to perform a function of at least one of the units.

22. A motor control method executed by a motor control device that controls a stepping motor, the motor control method comprising:
detecting a rotational phase of a rotor of the stepping motor;
generating a driving waveform for driving the stepping motor; and
detecting a phase difference between a rotational phase of the rotor and a phase of the driving waveform and controlling an amplitude or a period of the driving waveform to control the phase difference,
determining a target phase difference from a variation of the phase difference with respect to a variation of the amplitude of the driving waveform and a step of controlling the amplitude of the driving waveform in accordance with the determined target phase difference.

* * * * *